(12) United States Patent
Kimura et al.

(10) Patent No.: US 8,862,915 B2
(45) Date of Patent: *Oct. 14, 2014

(54) GATEWAY CARD, GATEWAY DEVICE, METHOD OF CONTROLLING GATEWAY CARD, AND COMPUTER PRODUCT

(75) Inventors: Masatoshi Kimura, Kawasaki (JP); Toshiki Yamazaki, Kawasaki (JP); Shuichi Suzuki, Kawasaki (JP); Shigeo Sakuma, Kawasaki (JP); Yoshiya Yoshimoto, Nagoya (JP); Hiroshi Okamoto, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 1076 days.

This patent is subject to a terminal disclaimer.

(21) Appl. No.: 12/923,064

(22) Filed: Aug. 31, 2010

(65) Prior Publication Data
US 2010/0332881 A1  Dec. 30, 2010

Related U.S. Application Data

(62) Division of application No. 11/783,786, filed on Apr. 12, 2007, now Pat. No. 7,814,352, which is a division of application No. 10/660,791, filed on Sep. 12, 2003, now Pat. No. 7,225,351.

(30) Foreign Application Priority Data

Sep. 13, 2002  (JP) ................................ 2002-269257
Feb. 6, 2003   (JP) ................................ 2003-029923

(51) Int. Cl.
*G06F 1/26* (2006.01)
*G06F 1/32* (2006.01)
*H04L 12/28* (2006.01)
*H04L 12/10* (2006.01)
*H04L 12/12* (2006.01)

(52) U.S. Cl.
CPC ........ *H04L 12/2832* (2013.01); *H04L 12/2803* (2013.01); *H04L 12/10* (2013.01); *Y02B 60/32* (2013.01); *H04L 12/12* (2013.01); *G06F 1/3203* (2013.01); *Y02B 60/34* (2013.01)
USPC .......................................................... 713/320

(58) Field of Classification Search
None
See application file for complete search history.

(56) References Cited

U.S. PATENT DOCUMENTS

| 5,406,064 | A | 4/1995 | Takahashi ...................... 235/492 |
| 5,485,625 | A | 1/1996 | Gumkowski ................... 713/323 |
| 5,572,683 | A | 11/1996 | Epolite et al. ................. 710/104 |
| 5,809,115 | A | 9/1998 | Inkinen ...................... 379/93.05 |
| 5,903,765 | A | 5/1999 | White et al. |
| 6,122,713 | A | 9/2000 | Huang et al. .................. 711/147 |

(Continued)

FOREIGN PATENT DOCUMENTS

| EP | 1 199 879 A2 | 4/2002 |
| JP | 61-275945 | 12/1986 |

(Continued)

*Primary Examiner* — Thomas Lee
*Assistant Examiner* — Gayathri Sampath
(74) *Attorney, Agent, or Firm* — Kratz, Quintos & Hanson, LLP

(57) ABSTRACT

A gateway card is connected to an information processor, and receives and transmits data between different networks. The information processor has a normal power mode and a power saving mode. A switching unit connects a memory with the information processor if the information processor is in the normal power mode, or to the gateway card if the normal power mode of the information processor is changed to the power saving mode.

18 Claims, 17 Drawing Sheets

(56) References Cited

U.S. PATENT DOCUMENTS

| | | | |
|---|---|---|---|
| 6,138,165 A | 10/2000 | Nakatsugawa | 709/245 |
| 6,247,079 B1 | 6/2001 | Papa et al. | |
| 6,438,684 B1 | 8/2002 | Mitchell et al. | 713/1 |
| 6,608,400 B1 | 8/2003 | Muehsam | 307/23 |
| 6,715,091 B1 | 3/2004 | Kundu | 713/323 |
| 6,993,571 B2 | 1/2006 | Kistler | 709/218 |
| 7,225,351 B2 | 5/2007 | Kimura et al. | 713/324 |
| 7,352,756 B2 | 4/2008 | Kimura et al. | 370/401 |
| 2001/0036192 A1 | 11/2001 | Chiles et al. | 370/401 |
| 2002/0065044 A1 | 5/2002 | Ito | 455/41 |
| 2002/0083280 A1 | 6/2002 | Naitoh et al. | 711/158 |
| 2002/0156899 A1 | 10/2002 | Sekiguchi | 709/227 |
| 2003/0007614 A1 | 1/2003 | Lamb et al. | 379/93.36 |
| 2003/0033067 A1 | 2/2003 | Arita et al. | 701/48 |
| 2004/0052347 A1 | 3/2004 | Kimura et al. | 379/102.01 |
| 2004/0053643 A1 | 3/2004 | Kimura | 455/558 |
| 2004/0107371 A1 | 6/2004 | Kimura et al. | 713/300 |
| 2004/0151149 A1 | 8/2004 | Song et al. | 370/338 |
| 2004/0205146 A1 | 10/2004 | Kimura et al. | 709/213 |
| 2004/0208188 A1 | 10/2004 | Kimura et al. | 370/401 |

FOREIGN PATENT DOCUMENTS

| | | |
|---|---|---|
| JP | 2000-285090 | 10/1994 |
| JP | 7-56694 | 3/1995 |
| JP | 10-254636 | 9/1998 |
| JP | 10-320259 | 12/1998 |
| JP | 11-58412 | 3/1999 |
| JP | 11-249967 | 9/1999 |
| JP | 2000-267928 | 9/2000 |
| JP | 6-301631 | 10/2007 |

HOME SERVER FUNCTION IS STARTING. PLEASE WAIT FOR A WHILE.

ERROR OCCURRED

FIG.14

| GATEWAY CARD STATUS | PERSONAL COMPUTER STATUS | PROCESSING BY MAIN CONTROL SECTION OF GATEWAY CARD. |
|---|---|---|
| ON | ON | ACCESS COMMON HDD VIA PERSONAL COMPUTER. |
| ON | OFF | ACCESS COMMON HDD DIRECTLY. |
| ON | ON→OFF | CLEAR ACCESSED DATA AND DISK CACHE VIA PERSONAL COMPUTER, AND ACCESS COMMON HDD DIRECTLY AGAIN. |
| ON | OFF→ON | CLEAR DATA AND DISK CACHE, AFTER ENDING ACCESS PROCESSING TO COMMON HDD IMMEDIATELY AFTER SWITCHING. ACCESS COMMON HDD VIA PERSONAL COMPUTER ONCE AGAIN, AFTER SWITCHING SWITCHING SECTION TO PERSONAL COMPUTER. |
| ON | OFF→ON (MIDDLE OF BOOTING) | RETRY ACCESS VIA PERSONAL COMPUTER. |
| ON | OFF→ON (MIDDLE OF END PROCESSING) | RETRY ACCESS VIA PERSONAL COMPUTER. ACCESS COMMON HDD DIRECTLY, AFTER TURNING OFF PERSONAL COMPUTER. |
| ON→OFF | ON | ACCESS COMMON HDD VIA PERSONAL COMPUTER. |
| ON→OFF | OFF | ACCESS COMMON HDD DIRECTLY. |
| OFF→ON | OFF | ACCESS COMMON HDD DIRECTLY. |
| OFF→ON | ON | ACCESS VIA PERSONAL COMPUTER. |
| OFF | ON | TURNING OFF OF GATEWAY CARD IS NOT ASSUMED. |
| OFF | OFF | |
| OFF | ON→OFF | |
| OFF | OFF→ON | |

GATEWAY CARD, GATEWAY DEVICE, METHOD OF CONTROLLING GATEWAY CARD, AND COMPUTER PRODUCT

CROSS-REFERENCE TO RELATED APPLICATIONS

This application is a Divisional of prior application Ser. No. 11/783,786 filed on Apr. 12, 2007 now U.S. Pat. No. 7,814,352; which is a divisional application of Ser. No. 10/660,791, filed Sep. 12, 2003 now U.S. Pat. No. 7,225,351, the entire contents of which are incorporated herein by reference, which is based on Japanese Application Numbers 2002-269257, filed Sep. 13, 2002 and 2003-029923, filed Feb. 6, 2003, the entire contents of which are incorporated herein by reference.

BACKGROUND OF THE INVENTION

1) Field of the Invention

The present invention relates to a technology for connecting a memory to an information processor or to a gateway card.

2) Description of the Related Art

Recently, not only personal computers, but also home appliances such as the televisions and telephones, have been equipped with the Internet connection function. Such Internet function makes it possible to connect these home appliances to the Internet.

When a user purchases such an home appliances, it is required to do settings so that the home appliances can be connected to an access point of the Internet. These settings generally take lot of time and are tedious. Moreover, it is necessary to connect these home appliances to telephone lines, to computers etc. These connections are generally complex and troublesome.

A gateway device, called home gateway, has attracted attention in recent years. What this device does is that it adjusts the differences in the communication protocols between the network at home and external networks including the Internet.

Precisely, all the home appliances that have the Internet connection function are connected to this gateway device and the gateway device is connected to the public telephone line or other network: All the home appliances connected to the gateway device can be connected to the Internet so that tedious settings or complex wiring is not required.

A remote control system that remote controls home appliances such as a video recorder via the Internet and the gateway apparatus, has been proposed. Such remote control systems have been disclosed in the Japanese Patent Application Laid-Open Nos. 2002-78036, 2001-95067, 2002-77274, and 2001-53779.

In installing a gateway device at home, conventionally there is a large constraint in the installation space. Electric charges, capacity, and power consumption of the gateway devices are taken into consideration before their installation. For example, when such gateway devices are to be used in the offices, reliability of the gateway device is given priority over its power consumption. However, when such gateway devices are to be used at homes, the power consumption is given priority over the reliability.

SUMMARY OF THE INVENTION

It is an object of the present invention to at least solve the problem in the conventional technology.

A gateway card according to one aspect of the present invention is connected to an information processor and that receives and transmits data between different networks, the information processor having a normal power mode and a power saving mode. This gateway card includes a switching unit that connects a memory with either the information processor or the gateway card; and a switch control unit that controls the switching unit to connect the memory to the information processor when the information processor is in the normal power mode, and controls the switching unit to connect the memory to the gateway card when the normal power mode of the information processor is changed to the power saving mode.

A method according to another aspect of the present invention is a method of controlling a gateway card, which is connected to an information processor and which receives and transmits data between different networks, the information processor having a normal power mode and a power saving mode. This method includes connecting the information processor to a memory when the information processor is in the normal power mode; and connecting the gateway card to the memory when the normal power mode of the information processor is changed to the power saving mode.

A gateway device according to still another aspect of the present invention includes a memory; an information processor with a power control unit that shifts an operation status of the information processor from a normal power mode to a power saving mode and vice versa based on a predetermined condition; and a gateway card that is connected to the information processor and that receives and transmits data between different networks. This gateway card includes a switching unit that connects the memory with either the information processor or the gateway card; and a switch control unit that controls the switching unit to connect the memory to the information processor when the information processor is in the normal power mode, and controls the switching unit to connect the memory to the gateway card when the normal power mode of the information processor is changed to the power saving mode.

A method according to still another aspect of the present invention is a method of controlling a gateway device having a memory; an information processor with a normal power mode and a power saving mode, wherein the normal power mode is changed to the power saving mode and vice versa based on a predetermined condition; and a gateway card that is connected to the information processor and that receives and transmits data between different networks. This method includes connecting the information processor to the memory when the information processor is in the normal power mode; and connecting the gateway card to the memory when the normal power mode of the information processor is changed to the power saving mode.

A computer program according to still another aspect of the present invention realizes the methods according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 14 is an operation table of the operation of the main control section according to a first modification of the second embodiment;

DETAILED DESCRIPTIONS

Exemplary embodiments of the gateway card, the gateway device, the gateway control method, and the computer program relating to the present invention will be explained in detail below with reference to the accompanying drawings.

Figure 1:
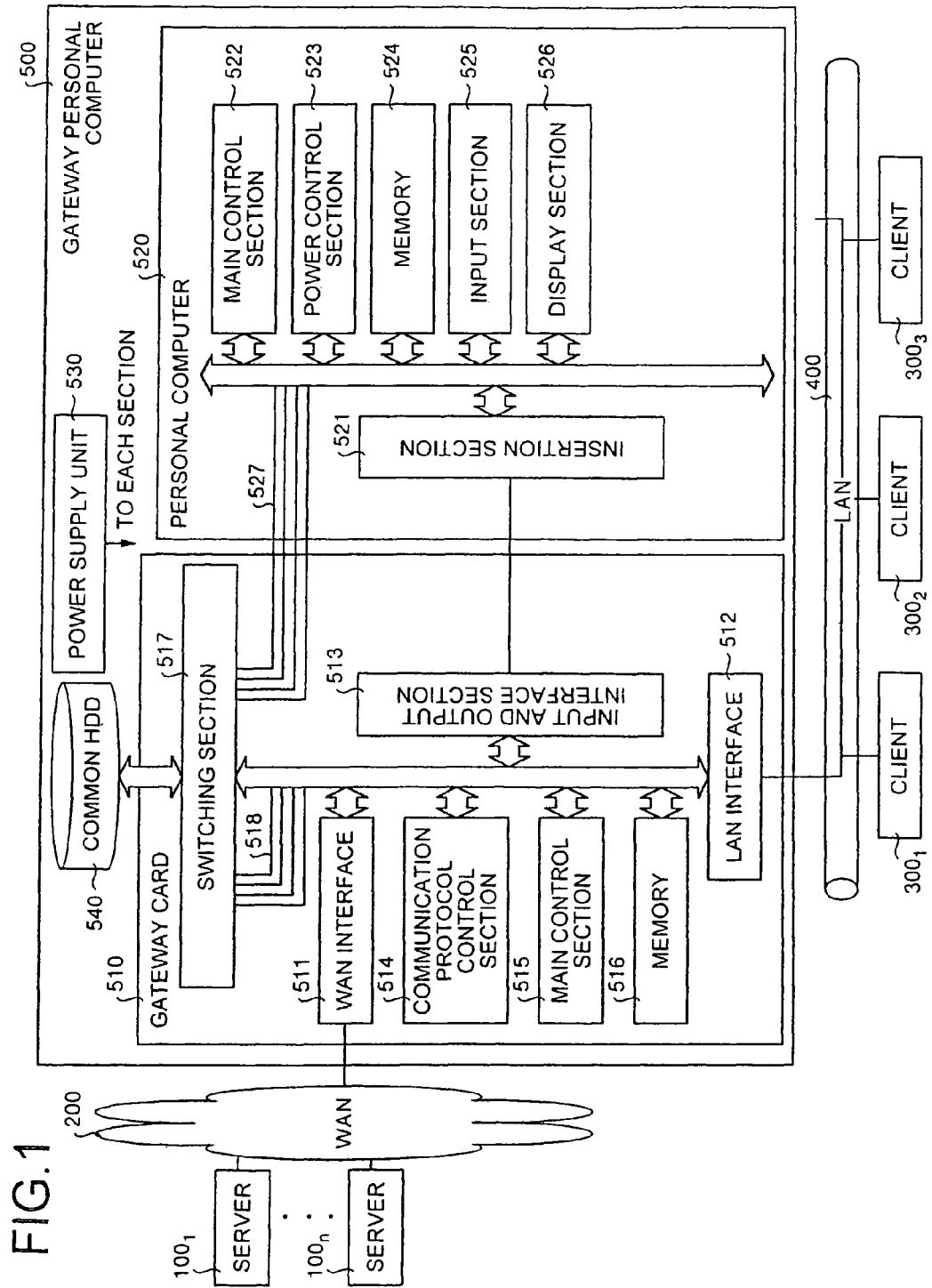
FIG. 1 is a block diagram of a structure of a remote control system according to one embodiment of the present invention.

FIG. 1 is a block diagram of a structure of a communication system according to one embodiment of the present invention. In this communication system, a WAN (Wide Area Network) 200 and a LAN (Local Area Network) 400, having mutually different communication protocols and standards, are connected to each other via a gateway personal computer 500.

The gateway personal computer 500 has a common hard disk drive (hereinafter, "HDD") 540 shared by a gateway card 510 and a personal computer 520.

The WAN 200 is a network such as the Internet, a public line network, a radio communication network, a CATV (CAble TeleVision) network, and the like. The WAN 200 interconnects remote computers to each other according to predetermined, mutually different communication protocols. The WAN 200 will be explained by taking the Internet as an example.

Servers $100_1$ to $100_n$ are connected to the WAN 200. The servers $100_1$ to $100_n$ are, for example, mail servers, WWW (World Wide Web) servers, and the like. The servers $100_1$ to $100_n$ provide mail services, WWW site services, etc. to clients $300_1$ to $300_3$ via the gateway personal computer 500 and the LAN 400 to be described later.

The clients $300_1$ to $300_3$ are the apparatuses that are equipped with a network connection function and are installed at home. The clients $300_1$ to $300_3$ are, for example, personal computers and electric appliances such as televisions, telephones, and audio apparatuses.

The clients $300_1$ to $300_3$ are connected to the LAN 400. The clients $300_1$ to $300_3$ have a function of receiving various kinds of services by making access to the servers $100_1$ to $100_n$ via the LAN 400, the gateway personal computer 500, and the WAN 200.

Further, the clients $300_1$ to $300_3$ also have a function of receiving various kinds of data by making access to a personal computer 520 via the LAN 400 and the gateway personal computer 500.

Since the clients $300_1$ to $300_3$ are installed inside the home they will be termed as internal apparatuses and, since the servers $100_1$ to $100_n$ are installed outside the home they will be termed as external apparatuses. Thus, the internal apparatuses can make access to the external apparatuses via the gateway personal computer 520 or even to the gateway personal computer 520.

The gateway personal computer 500 is a personal computer installed at home and exclusively used to provide functions of a gateway such as a router function and a bridge function. The gateway is a general term of hardware and software that makes it possible to interconnect the WAN 200 and the LAN 400 by adjusting a difference between the communication protocols of these networks.

The gateway personal computer 500 has a gateway card 510, a personal computer 520, a power supply unit 530, and a common HDD 540.

The gateway card 510 is a card-type gateway device that can be detachably inserted into an insertion section 521 of the personal computer 520, and this gateway card provides the functions of the gateway.

The personal computer 520 is a general purpose personal computer. The power supply unit 530 supplies power to each section of the gateway card 510 and the personal computer 520.

The common HDD 540 is a large-capacity memory that is shared by the gateway card 510 and the personal computer 520. This common HDD 540 stores, for example, the operating systems and the application programs that are used in the gateway card 510 and the personal computer 520 respectively. A switching section 517 executes a switching of the access to the common HDD 540.

The gateway card 510 has a WAN interface section 511 that is connected to the WAN 200. The WAN interface section 511 functions as a communication interface with the WAN 200. Similarly, the gateway card 510 has a LAN interface section 512 that is connected to the LAN 400. The LAN interface section 512 functions as a communication interface with the LAN 400.

The gateway card 510 has an input/output interface section 513 that is detachably inserted into the insertion section 521 of the personal computer 520. The input/output interface section 513 functions as an interface with the personal computer 520.

The gateway card 510 has a communication protocol control section 514 that carries out a control to adjust a difference between the communication protocols of the WAN 200 and the LAN 400. That is, the communication protocol control section 514 performs the analysis of communication protocols of the WAN 200 and the LAN 400 to make interconnection possible.

The gateway card has a main control section 515 that controls a switching of a switching section 517 and controls communication between the gateway card 510 and the personal computer 520. A detailed operation of the main control section 515 will be explained later.

The gateway card 510 has a memory 516 that is a rewritable read-only memory that requires no back-up power supply and can electrically erase stored data. This memory 516 is a flash EPROM (Erasable Programmable Read Only Memory) or the like.

The memory 516 stores system data and other data. When the gateway card 510 provides functions of a router, for example, the system data includes an IP (Internet Protocol) address, Dynamic Host Configuration Protocol (hereinafter, "DHCP") data, line data, filtering data, and firmware.

Figure 2:
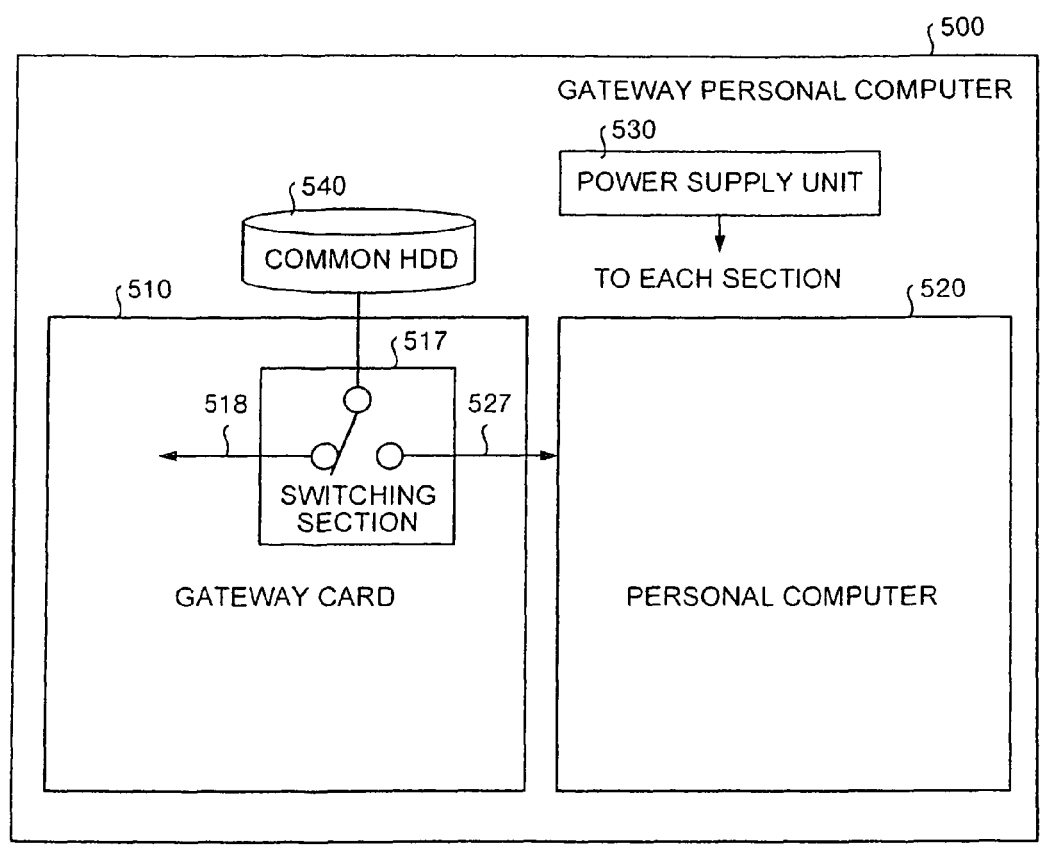
FIG. 2 is a block diagram of a detailed structure of a switching section illustrated in FIG. 1.

The gateway card 510 has a switching section 517 that can connect the common HDD 540 to the gateway card 510 or to the personal computer 520. FIG. 2 is a block diagram of the detailed structure of the switching section 517.

Specifically, the switching section 517 has a function of switching between the gateway card 510 and the personal computer 520 by switching over between an integrated drive electronics (hereinafter, "IDE") 518 bus and an IDE bus 527.

The IDE bus 518 is provided in the gateway card 510. On the other hand, the IDE bus 527 is provided in the personal computer 520.

When the switching section 517 connects the gateway card 510 to the common HDD 540, the gateway card 510 can access the common HDD 540.

On the other hand, when the switching section 517 connects the gateway card 510 to the personal computer 520, the personal computer 520 can access the common HDD 540. Also, when the switching section 517 is switched over to the personal computer 520, the gateway card 510 can access the common HDD 540 via the personal computer 520 and the switching section 517.

Referring back to FIG. 1, the personal computer 520 has a main control section 522 that controls operation of every section of the personal computer 520. A detailed operation of the main control section 522 will be explained later.

A power control section 523 switches between the normal power mode or the power saving mode at the time of supplying power from a power supply unit 530 to each section of the personal computer 520.

The normal power mode is when a rated power is supplied to each section of the personal computer 520. The power saving mode is when a minimum necessary power (that is lower than the rated power) is supplied to every section of the personal computer 520. Since low power is supplied in the power saving mode, it is possible to save power and reduce the electric bill in the power saving mode.

The power saving mode is classified into a standby mode and a suspension mode. In the standby mode, a memory 524 in the personal computer 520 stores the work data and, therefore, it is necessary to keep supplying power to this memory 524. On the other hand, in the suspension mode, the common HDD 540 stores the work data, and power supply to this common HDD 540 is set off. Thus, in the suspension mode there is no need to supply power to the personal computer 520. As a result, power consumption in the suspension mode is much smaller than that in the standby mode.

The power controller 523 changes the power mode from a normal power mode to a power saving mode when a shift factor occurs, and returning the power mode from the power saving mode to the normal power mode when a return factor occurs.

The shift factor includes an end of an access from any one of the clients $300_1$ to $300_3$ to the personal computer 520. On the other hand, the return factor includes an access request from any one of the clients $300_1$ to $300_3$ to the personal computer 520.

The memory 524 stores various kinds of data. An input section 525 includes a keyboard and a mouse. the input section 525 is used to input various kinds of data. A display section 526 is a CRT (Cathode Ray Tube) or an LCD (Liquid Crystal Display). The display section 526 displays screens and data under the control of the main control section 522.

Figure 3:
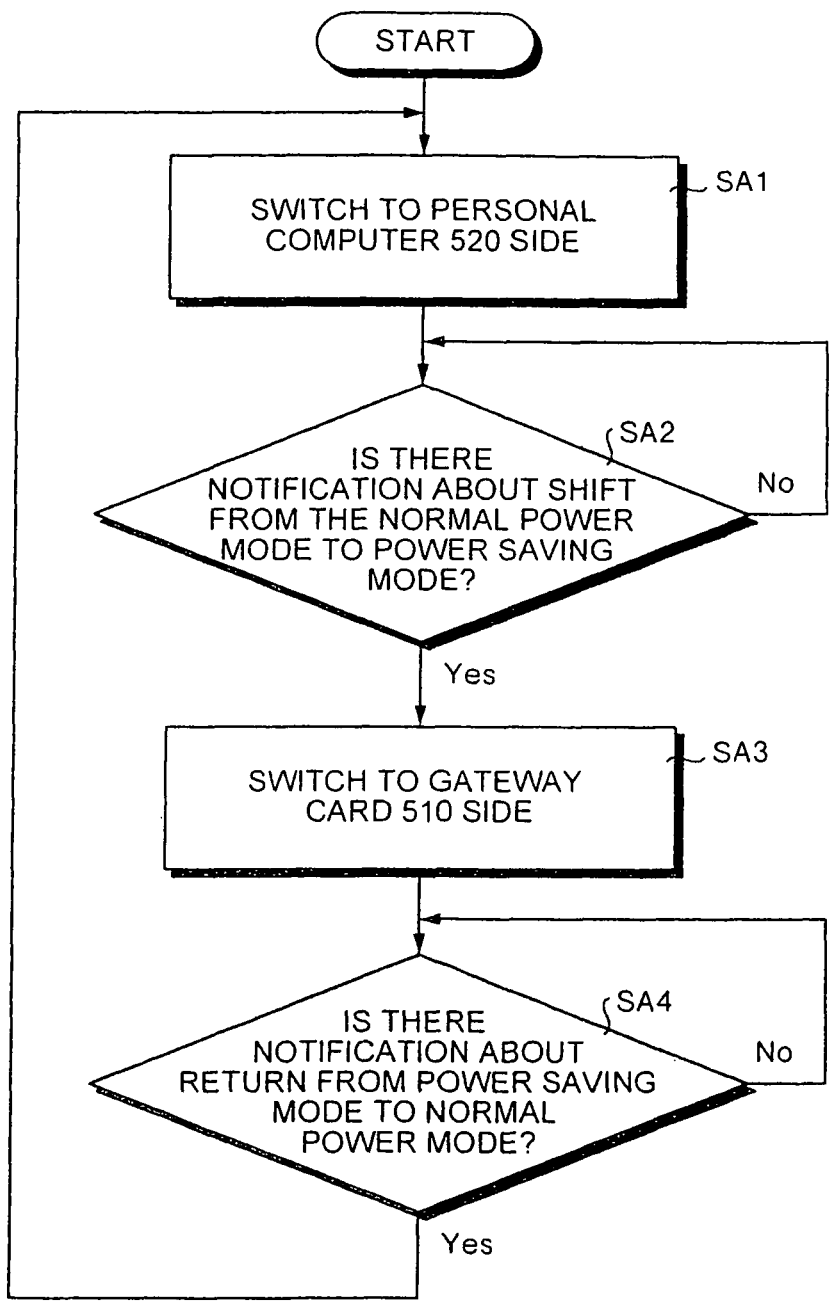
FIG. 3 is a flowchart of an outline switching operation of the switching section illustrated in FIG. 2.
Figure 4:
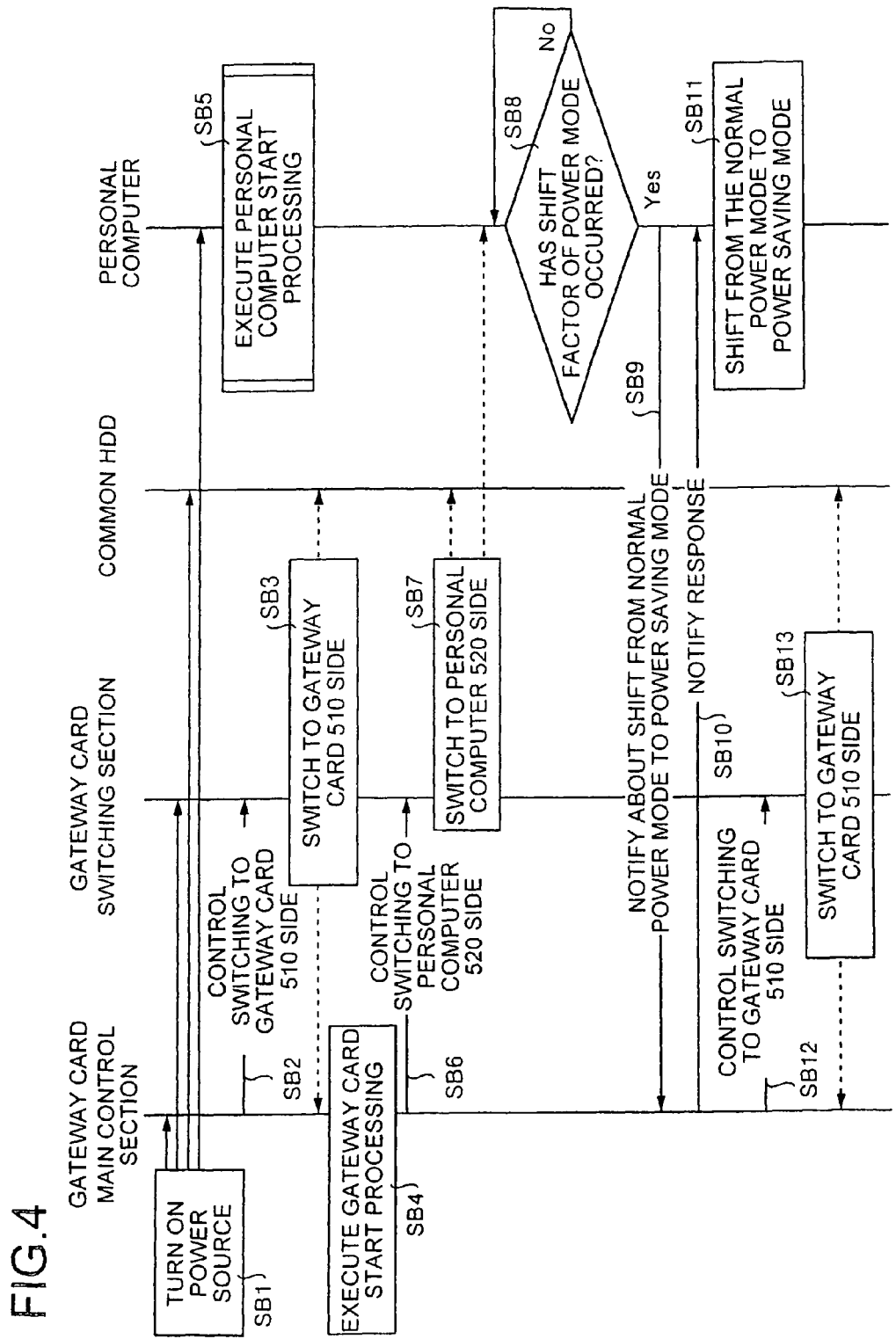
FIG. 4 is a sequence diagram of the operation of a gateway personal computer according to the first embodiment of the present invention.

The operation of the gateway personal computer according to the first embodiment of the present invention is explained next, with reference to FIG. 3 to FIG. 6. FIG. 3 is a flowchart of an outline switching operation of the switching section 517 illustrated in FIG. 1 and FIG. 2. FIG. 4 is a sequence diagram of the operation of the gateway personal computer according to the first embodiment.

The outline switching operation of the switching section 517 is explained with reference to FIG. 3. After both the gateway card 510 and the personal computer 520 illustrated in FIG. 2 are started, the main control section 515 switches the switching section 517 to the personal computer 520 side at step SA1 illustrated in FIG. 3.

Thus, the personal computer 520 can access the common HDD 540 via the IDE bus 527 and the switching section 517. The gateway card 510 (in other words, the main control section 515) can access the common HDD 540 via the personal computer 520, the IDE bus 527, and the switching section 517.

At step SA2, the main control section 515 decides whether the personal computer 520 notified the gateway card 510 about a shift from the normal power mode to the power saving mode. The main control section 515 sets "No" as a result of the decision made, and repeats the same step.

When the personal computer 520 notifies the gateway card 510 about a shift from the normal power mode to the power saving mode, the main control section 515 sets "Yes" as a result of the decision made at step SA2.

At step SA3, the main control section 515 switches the switching section 517 to the gateway card 510 side.

Thus, the gateway card 510 (in other words, the main control section 515) can access the common HDD 540 via the IDE bus 518 and the switching section 517. The personal computer 520 cannot access the common HDD 540.

At step SA4, the main control section 515 decides whether the personal computer 520 notified the gateway card 510 about a shift from the power saving mode to the normal power mode. The main control section 515 sets "No" as a result of the decision made, and repeats the same decision.

When the personal computer 520 notifies the gateway card 510 about a shift from the power saving mode to the normal power mode, the main control section 515 sets "Yes" as a result of the decision made at step SA4.

At step SA1, the main control section 515 switches the switching section 517 to the personal computer 520 side.

Thus, the personal computer 520 can access the common HDD 540 via the IDE bus 527 and the switching section 517. The gateway card 510 (in other words, the main control section 515) can access the common HDD 540 via the personal computer 520, the IDE bus 527, and the switching section 517. Thereafter, the main control section 515 proceeds to step SA2.

The operation of the gateway personal computer 500 according to the first embodiment is explained next with reference to a sequence diagram illustrated in FIG. 4. When the power source is ON at step SB1 illustrated in FIG. 4, the power supply unit 530 supplies power to the gateway card 510, the personal computer 520, and the common HDD 540 of the gateway personal computer 500.

In other words, the power source is turned ON to simultaneously start the gateway card 510, the personal computer 520, and the common HDD 540.

At step SB2, the main control section 515 outputs a switch control signal to the switching section 517 to switch to the gateway card 510 side. At step SB3, the switching section 517 is switched to the gateway card 510 side based on the switch control signal from the main control section 515.

Thus, the gateway card 510 (in other words, the main control section 515) can access the common HDD 540 via the IDE bus 518 and the switching section 517. The personal computer 520 cannot access the common HDD 540.

At step SB4, the main control section 515 boots the gateway card 510.

On the other hand, at step SB5, the main control section 522 of the personal computer 520 boots the personal computer 520 in parallel with booting the gateway card at step SB4. In this case, the personal computer 520 is in the normal power mode. At step SB5, the main control section 515 outputs a switch control signal to the switching section 517 to switch to the personal computer 520 side.

The boot process of the personal computer 520 is explained with reference to FIG. 5. At step SC1, the main control section 522 starts the power on self test (hereinafter, "POST") processing when the power supply is turned ON, confirms the capacity of the memory 524, and initializes the display section 526. At step SC2, the main control section 522 decides whether the common HDD 540 can be recognized via the IDE bus 527 and the switching section 517. In other words, the main control section 522 decides whether the switching section 517 is switched to the personal computer 520 side.

When a result of the decision made at step SC2 is "No", the main control section 522 decides, at step SC3, whether the gateway card 510 can be recognized, that is, whether the input and output interface 513 is inserted into the insertion section 521. The main control section 522 sets "Yes" as a result of the decision and proceeds to step SC4. However, when a result of the decision made at step SC2 is "Yes", the main control section 522 executes the processing at step SC9.

Figure 6A:
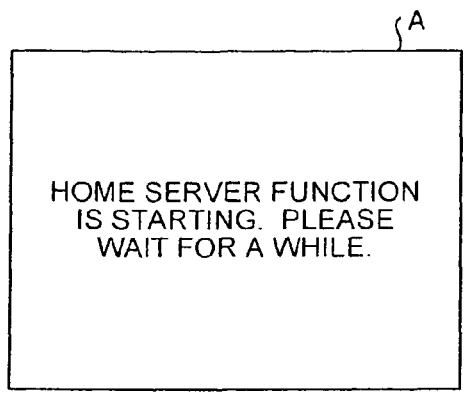
FIGS. 6A and 6B illustrate various kinds of message displays according to the first embodiment.

At step SC4, the main control section 522 makes the display section 526 display the start message A (see FIG. 6A). Therefore a user can recognize that the home server function is starting.

At step SC5, the main control section 522 sets a retry time (=n minutes, for example, two minutes) until the recognition of the common HDD 540. At step SC6, the main control section 522 decides whether the common HDD 540 can be recognized via the IDE bus 527 and the switching section 517, that is, whether the switching section 517 has been switched to the personal computer 520 side.

When a result of the decision made at step SC6 is "No", this indicates that the switching to the personal computer 520 side is not completed at step SB7 (refer to FIG. 4). The main control section 522 repeats the processing to recognize the common HDD 540 by the retry time.

At step SC7, the main control section 522 decides a time out, that is, whether the time since the start of the processing of recognizing the common HDD 540 exceeds the retry time. In this case, the main control section 522 sets "No" as a result of the decision made, and returns control to step SC6.

At step SB6 illustrated in FIG. 4, the main control section 515 outputs a switch control signal to the switching section 517 to switch to the personal computer 520 side. At step SB7, the switching section 517 is switched to the personal computer 520 side based on the switch control signal from the main control section 515.

Figure 5:
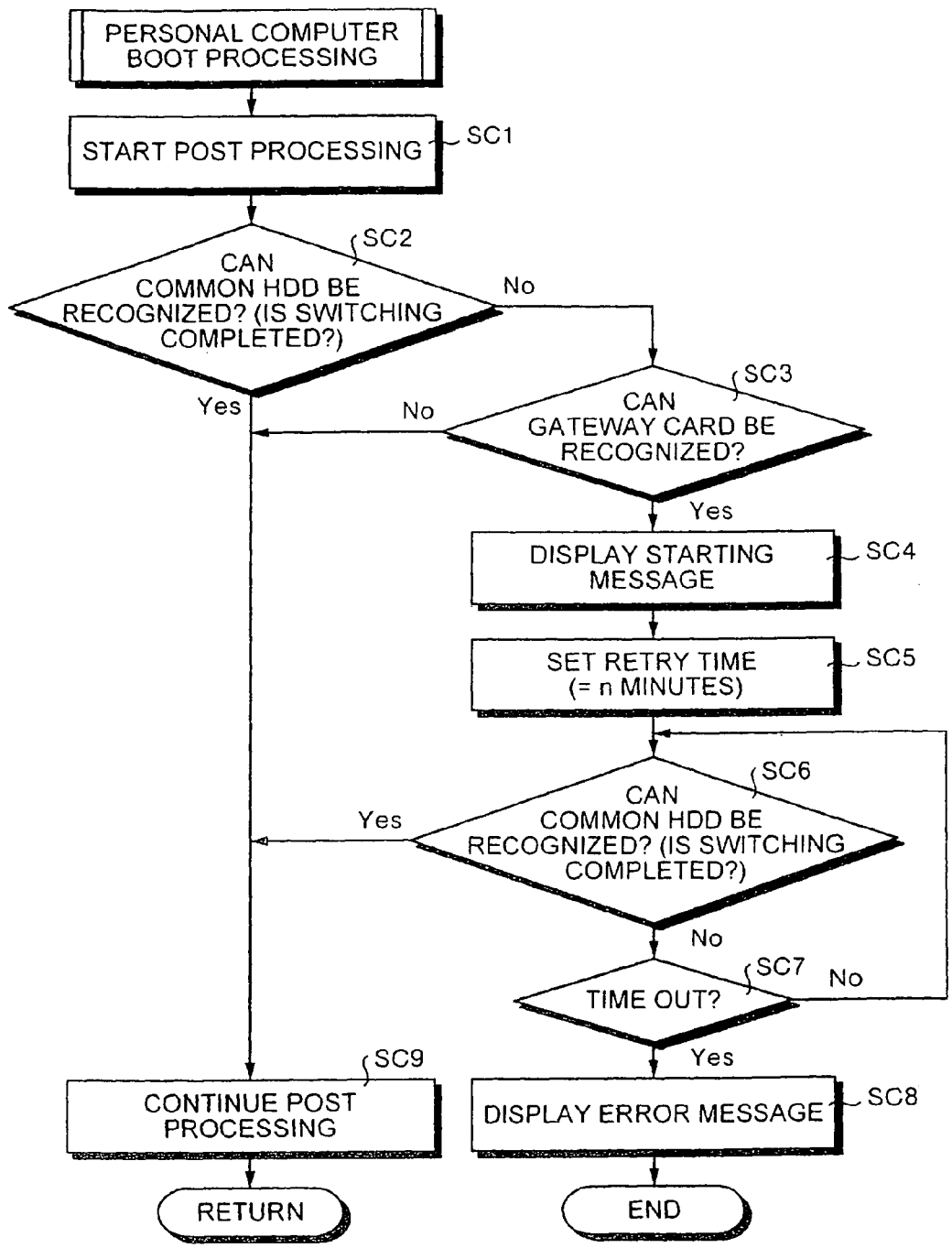
FIG. 5 is a flowchart of a boot processing of the personal computer.

Thus, the main control section 522 sets "Yes" as a result of the decision made at step SC6 (in FIG. 5). At step SC9, the main control section 522 continues the POST processing.

Figure 6B:
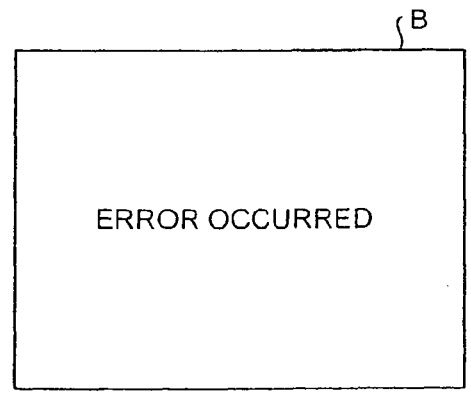

On the other hand, when a result of the decision made at step SC7 in FIG. 5 is "Yes", that is, when the common HDD 540 cannot be recognized even when the switching section 517 is switched to the personal computer 520 side, the main control section 522, at step SC8, makes the display section 526 display an error message B (see FIG. 6B). Therefore, a user can recognize the occurrence of the error.

At step SB8 illustrated in FIG. 4, the main control section 522 of the personal computer 520 decides whether a shift factor of the power mode occurred. The main control section 522 sets "No" as a result of the decision made, and repeats the same step.

When a shift factor of the power mode occurs, the main control section 522 sets "Yes" as a result of the decision made at step SB8. At step SB9, the main control section 522 notifies the gateway card 510 about a shift from the normal power mode to the power saving mode.

At step SB10, the main control section 515 of the gateway card 510 notifies a response to the main control section 522 of the personal computer 520 in response to the above shift of the power mode.

At step SB11, the main control section 522 of the personal computer 520 instructs the power control section 523 to shift the power mode from the normal power mode to the power saving mode. Accordingly, the power control section 523 shifts the power mode from the normal power mode to the power saving mode.

At step SB12, the main control section 515 outputs a switch control signal to the switching section 517 to switch to the gateway card 510 side. At step SB13, the switching section 517 is switched to the gateway card 510 side based on the switch control signal from the main control section 515.

Thus, the gateway card 510 (in other words, the main control section 515) can access the common HDD 540 via the IDE bus 518 and the switching section 517. The personal computer 520 is in the waiting state in the power saving mode, and cannot access the common HDD 540.

As explained above, according to the first embodiment of the present invention, the personal computer 520 and the gateway card 510 share the common HDD 540. When the power mode of the personal computer 520 is shifted from the normal power mode to the power saving mode, the switching section 517 is switched to the gateway card 510 side. Therefore, the gateway personal computer can save space and power.

Further, when both the personal computer 520 and the gateway card 510 are booted at the same time, the switching section 517 is switched to the gateway card 510 side. After the gateway card 510 is booted, the switching section 517 is switched to the personal computer 520 side. Therefore, the gateway card 510 and the personal computer 520 can be successfully booted in order.

In the first embodiment, a division of a utilization partition in the common HDD 540 between the gateway card 510 and the personal computer 520 illustrated in FIG. 1 is not particularly referred to. However, a utilization partition may be switched over based on the switching of the switching section 517. An example of this structure will be explained as a first modification of the first embodiment.

Figure 7:
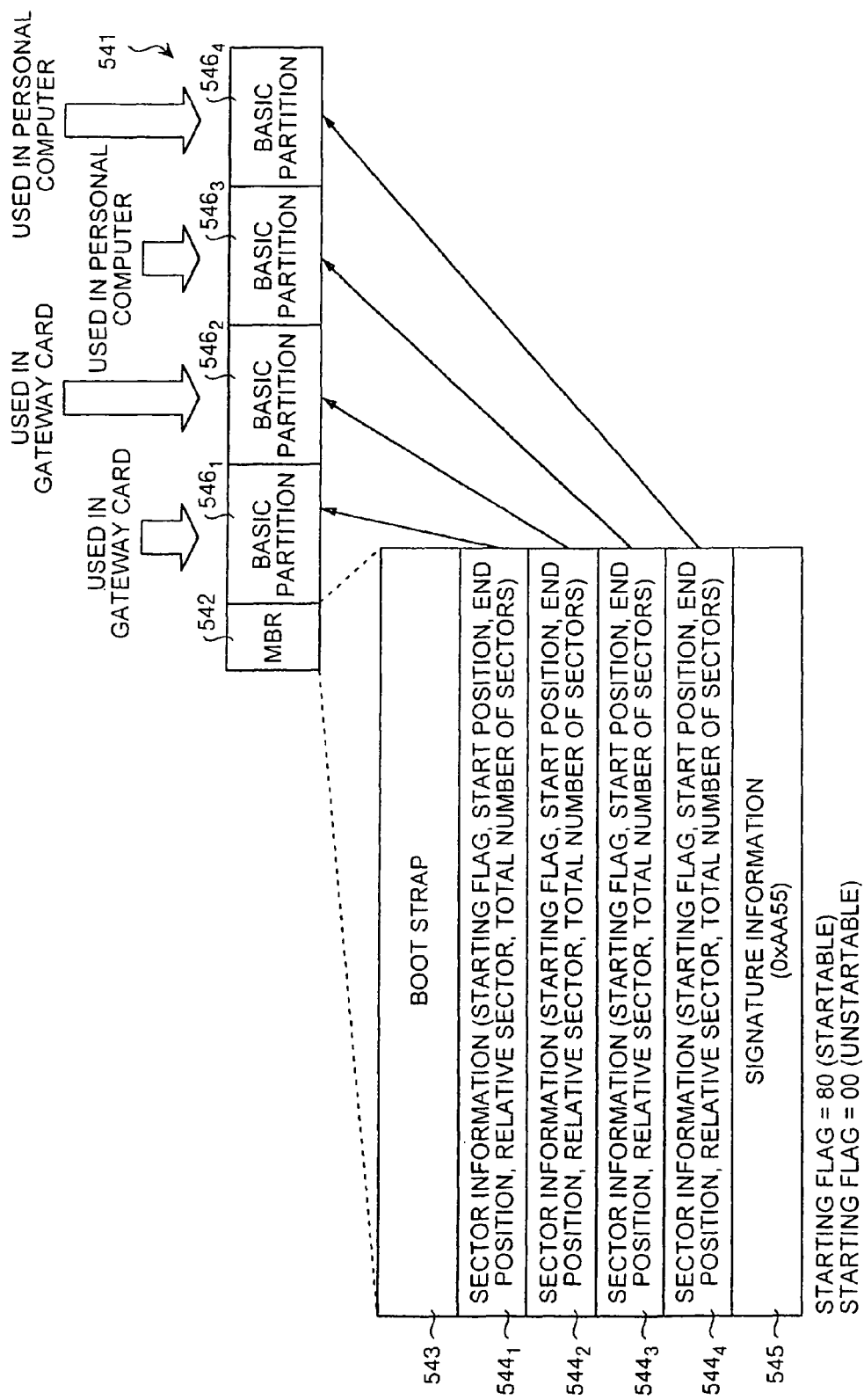
FIG. 7 illustrates a sector structure of a disk according to a first modification of the first embodiment.

FIG. 7 illustrates a sector structure of a disk according to a first modification of the first embodiment. FIG. 7 illustrates a disk 541 as a recording medium of the common HDD 540.

The disk 541 is divided into a master boot record (hereinafter, "MBR") 542 and four basic partitions $546_1$ to $546_4$. The MBR 542 is a header sector (512 bytes) of the disk 541, and is read only when the personal computer 520 is started.

The basic partitions $546_1$ and $546_2$ are used by the gateway card 510. Therefore, the basic partitions $546_1$ and $546_2$ store files and data that are used by the gateway card 510.

The basic partitions $546_3$ and $546_4$ are used by the personal computer 520. Therefore, the basic partitions $546_3$ and $546_4$ store files and data that are used by the personal computer 520.

The MBR 542 stores a boot strap loader 543 as a starting program, sector information $544_1$ to $544_4$, and signature information 545. The sector information $544_1$ to $544_4$ correspond to the basic partitions $546_1$ and $546_4$. This information includes fields such as a starting flag, a start position, an end position, a relative sector, and a total number of sectors.

The starting flag is set as 80 (i.e., startable: valid) or 00 (i.e., unstartable: invalid). The personal computer 520 illustrated in FIG. 1 is in the normal power mode. When the switching section 517 is in the process of being switched to the personal computer 520 side, the value of the starting flag of sector information $544_3$ is set as 80 (i.e., startable: valid), and the values of the starting flags of the other sector information $544_1$, $544_2$ and $544_4$ are set as 00 (i.e., unstartable: invalid).

In this case, out of the basic partitions $546_1$ to $546_4$, only the basic partition $546_3$ corresponding to the personal computer 520 can be started.

In the state that the the personal computer 520 is shifted from the normal power mode to the power saving mode, the value of the starting flag of the sector information $544_3$ is changed from 80 (i.e., startable: valid) to 00 (i.e., unstartable: invalid), and the value of the starting flag of the sector information $544_1$ is changed from 00 (i.e., unstartable: invalid) to 80 (i.e., startable: valid).

In this case, out of the basic partitions $546_1$ to $546_4$, only the basic partition $546_1$ corresponding to the gateway card 510 can be started.

The operation of the first modification of the first embodiment will be explained with reference to a sequence diagram illustrated in FIG. 8.

When the personal computer 520 illustrated in FIG. 1 is in the normal power mode and also when the switching section 517 is changed over to the personal computer 520 side, the value of the starting flag of the sector information $544_3$ is set as 80 (i.e., startable: valid), and the value of the starting flags of the sector information $544_1$, $544_2$ and $544_4$ are set as 00 (i.e., unstartable: invalid).

Figure 8:
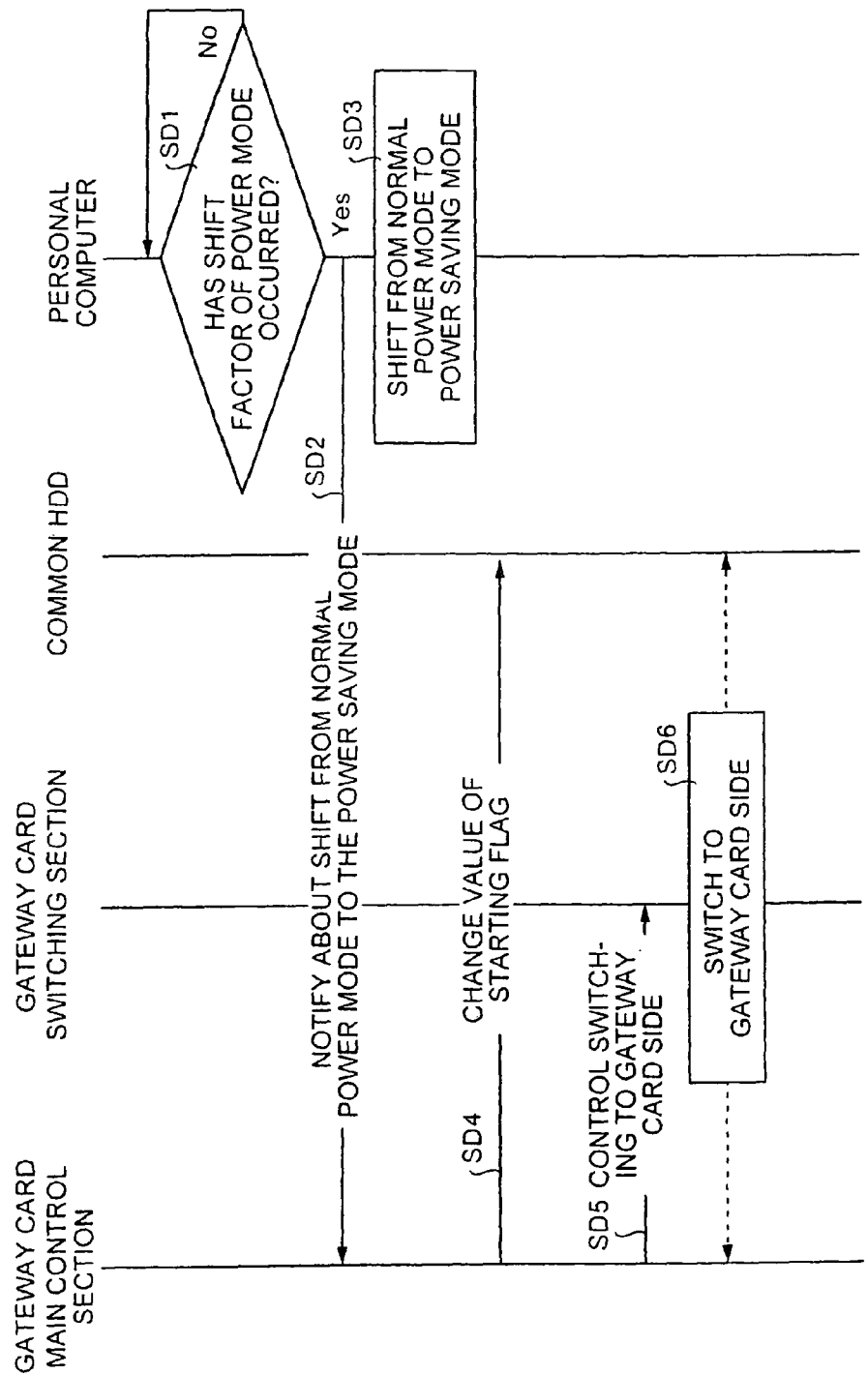
FIG. 8 is a sequence diagram of the operation of the gateway personal computer according to the first modification of the first embodiment.

In this state, at step SD1 illustrated in FIG. 8, the main control section 522 of the personal computer 520 decides whether a shift factor of the power mode occurred. In this case, the main control section 522 sets "No" as a result of the decision made, and repeats the same step.

When a shift factor of the power mode occurs, the main control section 522 sets "Yes" as a result of the decision made at step SD1. At step SD2, the main control section 522 notifies the gateway card 510 about a shift from the normal power mode to the power saving mode.

At step SD3, the main control section 522 of the personal computer 520 instructs the power control section 523 to shift the power mode from the normal power mode to the power saving mode. Accordingly, the power control section 523 shifts the power mode from the normal power mode to the power saving mode.

At step SD4, the main control section 515 changes the value of the starting flag of the sector information $544_3$ illustrated in FIG. 7 from 80 (i.e., startable: valid) to 00 (i.e., unstartable: invalid), and that of the starting flag of the sector information 544, from 00 (i.e., unstartable: invalid) to 80 (i.e., startable: valid).

As a result, out of the basic partitions $546_1$ to $546_4$, the startable basic partition $546_3$ (corresponding to the personal computer 520) is changed to the basic partition $546_1$ (corresponding to the gateway card 510).

At step SD5, the main control section 515 outputs a switch control signal to the switching section 517 to switch to the gateway card 510 side. At step SD6, the switching section 517 is switched to the gateway card 510 side based on the switch control signal from the main control section 515.

Thus, the gateway card 510 (in other words, the main control section 515) can access the common HDD 540 via the IDE bus 518 and the switching section 517. The main control section 515 accesses the basic partition $546_1$, in which the starting flag is set to 80 (i.e., startable: valid), by referring to the sector information $544_1$ to $544_4$, illustrated in FIG. 7.

As explained above, according to the first modification of the first embodiment, when the power mode of the personal computer 520 is shifted from the normal power mode to the power saving mode, the main control section 515 changes the value of the starting flag of the sector information $544_3$ illustrated in FIG. 7 from 80 (i.e., startable: valid) to 00 (i.e., unstartable: invalid), and that of the starting flag of the sector information $544_1$ from 00 (i.e., unstartable: invalid) to 80 (i.e., startable: valid). Therefore, before and after the switching, the sector information $544_3$ and the sector information $544_1$ are accurately allocated to the personal computer 520 and the gateway card 510, respectively, thereby to prevent the occurrence of a malfunctioning.

According to the first embodiment, when there is a difference between the data transfer speed at the gateway card 510 side (i.e., the IDE bus 518) and the data transfer speed at the personal computer 520 side (i.e., the IDE bus 527), (see FIG. 1) the operation of the common HDD 540 before and after the switching of the switching section 517 may become unstable.

In other words, from the viewpoint of the common HDD 540, when the data transfer speed of the accessing device changes (for example, from a low speed to a high speed) due to the switching of the switching section 517, the common HDD 540 cannot follow this change and may discard data.

Figure 9:
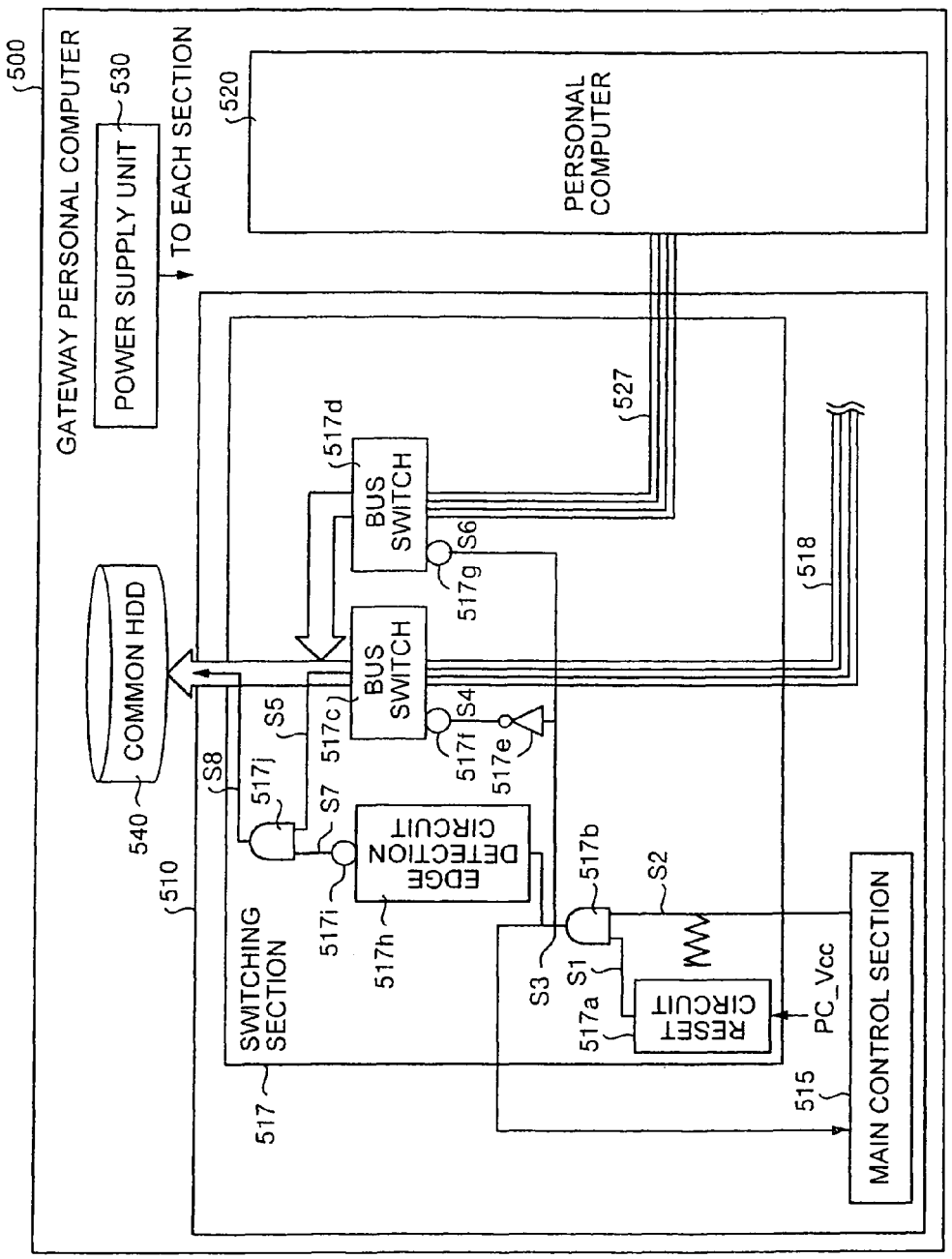
FIG. 9 is a block diagram of a structure of a switching section according to a second modification of the first embodiment.

A second modification of the first embodiment proposes a structure of the switching section that solves these problems. FIG. 9 is a block diagram of the structure of the switching section 5.17 according to the second modification of the first embodiment. In FIG. 9, portions corresponding to those in FIG. 1 are accompanied with like reference numerals. In the gateway card 510 and the personal computer 520 illustrated in FIG. 9, constituent elements other than the main control section 515, the switching section 517, the IDE bus 518, and the IDE bus 527 are not shown.

A reset circuit 517a of the switching section 517 outputs a reset signal S1 of "1" when a power source voltage PC_Vcc to be supplied to each section of the personal computer 520 is less than a threshold value (i.e., the power saving mode). On the other hand, the reset circuit 517a outputs the reset signal S1 of "0" when the power source voltage PC_Vcc is equal to or higher than the threshold value (i.e., the normal power mode).

In other words, the reset circuit 517a outputs the reset signal S1 of "1" when the power mode shifted from the normal power mode to the power saving mode. An AND circuit 517b takes AND of the reset signal S1 and a switch control signal S2 from the main control section 515, and outputs a signal S3. The switch control signal S2 is pulled up.

A signal S3 is also input to the main control section 515. When the signal S3 is "0", the main control section 515 recognizes that the power mode is the normal power mode and that the switching section 517 is switched to the personal computer 520 side. On the other hand, when the signal S3 is "1", the main control section 515 recognizes that the power mode is the power saving mode and that the switching section 517 is switched to the gateway card 510 side.

A bus switch 517c and a bus switch 517d connect any one of the IDE bus 518 and the IDE bus 527 to the common HDD 540, and these switches are exclusively controlled.

In other words, the bus switch 517c is turned ON and outputs a signal S5 of "1" when the signal S4 is "1". On the other hand, the bus switch 517c is turned OFF and outputs the signal S5 of "0" when the signal S4 is "0".

The signal S5 of "1" indicates that the switching section 517 is switched to the gateway card 510 side (i.e., the IDE bus 518). On the other hand, the signal S5 of "0" indicates that the switching section 517 is switched to the personal computer 520 side (i.e., the IDE bus 527).

The signal S4 is the signal S3 inverted twice, by inversion circuits 517e and 517f.

The bus switch 517d is turned ON when the signal S6 is "1", and is turned OFF when the signal S6 is "0". The signal S6 is the signal S3 inverted by inversion circuit 517g.

An edge detection circuit 517h detects a change of the signal S3 from "1" to "0", or from "0" to "1". The edge detection circuit 517h outputs "0" on detecting a change of the signal S3, and outputs "1" in other cases.

An inversion circuit 517i inverts the signal output from the edge detection circuit 517h as a signal S7. An AND circuit 517j takes AND of the signal S7 and the signal S5, and outputs an initialization signal S8 to the common HDD 540.

When the switching section 517 is switched from the personal computer 520 side to the gateway card 510 side, an initialization signal S8 is used to initialize the common HDD 540 to match the data transfer speed with that of the gateway card 510 side.

The operation of the personal computer according to the second modification will be explained next. When the personal computer 520 is the normal power mode, the power source voltage PC_Vcc is at the threshold voltage or above. Therefore, the reset circuit 517a outputs the reset signal S1 of "0".

In this case, the signal S3 is "0", and the signal S6 is "1" (i.e., the signal S4 is "0"). Therefore, the bus switch 517d is turned ON (i.e., the bus switch 517c is turned OFF), and the switching section 517 is switched to the personal computer 520 side. Accordingly, the common HDD 540 operates at the data transfer speed of the personal computer 520 side.

When a shift factor of the power mode occurs, the operation mode of the personal computer 520 is shifted from the normal power mode to the power saving mode, and the power source voltage PC_Vcc becomes less than the threshold value. Therefore, the reset signal S1 output from the reset circuit 517a changes from "0" to "1".

In this case, the signal S3 is "1", and the signal S4 is "1" (i.e., the signal S6 is "0"). Therefore, the bus switch 517c is turned ON (i.e., the bus switch 517d is turned OFF), and the switching section 517 is switched to the gateway card 510 side.

The bus switch 517c outputs the signal S5 of "1", and the inversion circuit 517i inverts the output signal from the edge detection circuit 517h to become the signal S7 of "1". As a result, the AND circuit 517j outputs the initialization signal S8 to the common HDD 540.

The common HDD 540 is initialized to match the data transfer speed with that of the gateway card 510 side. As a result, the common HDD 540 operates stably even after the switching.

As explained above, according to the second modification of the first embodiment, when the operation mode of the personal computer 520 is shifted from the normal power mode to the power saving mode, the switching section 517 is switched to the gateway card 510 side. The common HDD 540 is initialized to match the data transfer speed with that after the switching. Therefore, a malfunctioning due to a difference in the data transfer speed can be prevented.

Figure 10:
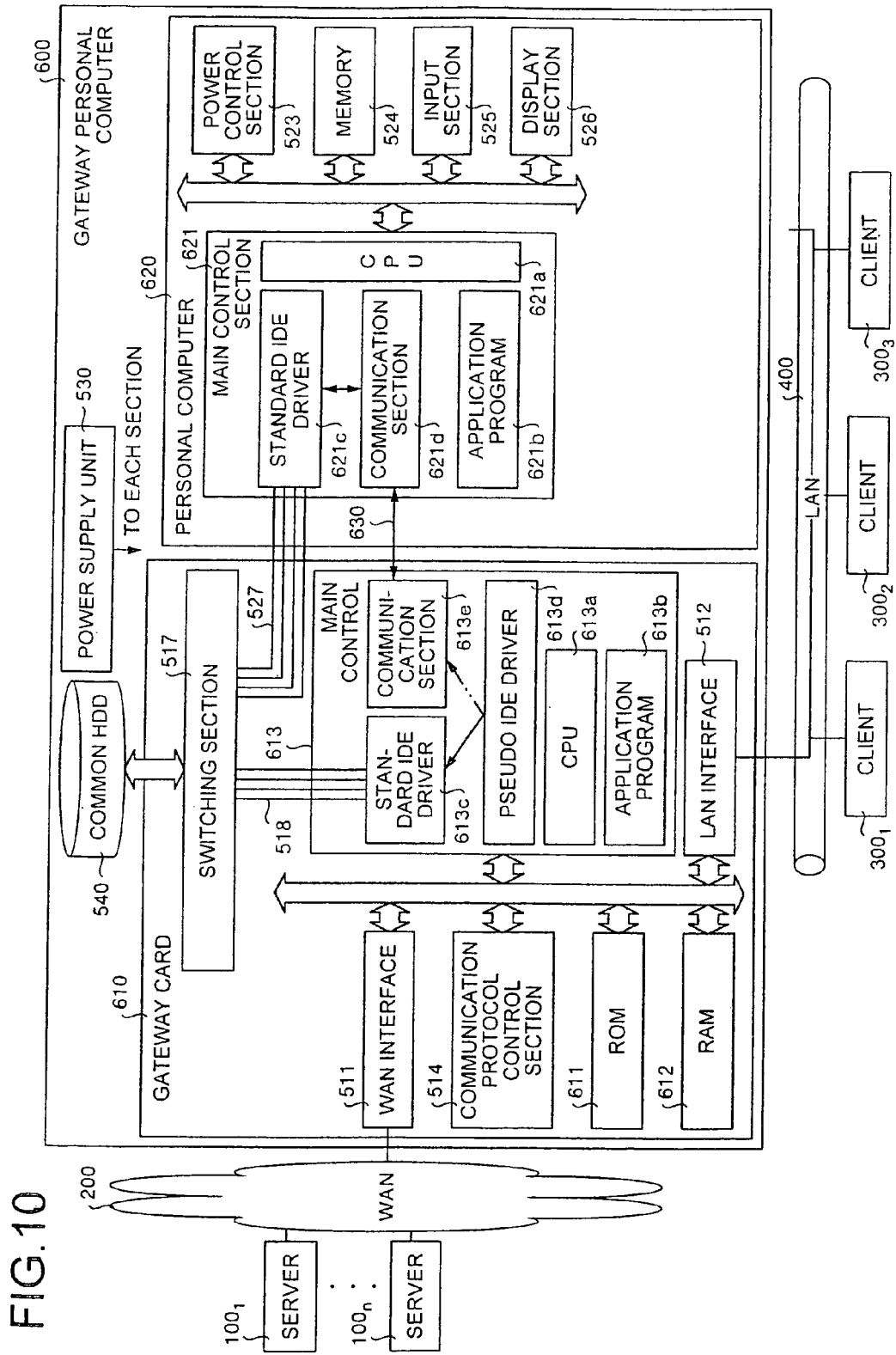
FIG. 10 is a block diagram of a structure of a personal computer according to a second embodiment of the present invention.

In the first embodiment, a detailed structure (particularly, the driver of the common HDD 540 and the like) of the main control section 515 of the gateway card 510 and the main control section 522 of the personal computer 520 illustrated in FIG. 1 is not referred to. These control sections may have a structure as illustrated in FIG. 10. This structure will be explained as a second embodiment of the present invention.

FIG. 10 is a block diagram of a structure of a personal computer according to the second embodiment of the present invention. In FIG. 10, portions corresponding to those in FIG. 1 are accompanied with like reference numerals, and their explanation will be omitted.

In FIG. 10, a gateway personal computer 600 (including a gateway card 610 and a personal computer 620) is provided in place of the gateway personal computer 500 (including the gateway card 510 and the personal computer 520) illustrated in FIG. 1.

The gateway personal computer 600 has such a structure that the gateway card 610 and the personal computer 620 share the common HDD 540 to save space.

A basic function of the gateway personal computer 600 including the sharing of the hard disk and the like is substantially the same as that of the gateway personal computer 500. The gateway card 610 has a read-only memory (hereinafter, "ROM") 611 and a random access memory (hereinafter, "RAM") 612 in place of the memory 516 illustrated in FIG. 1.

The ROM 611 is a read-only memory. The ROM 611 stores a kernel and a starting program of an operating system. The operating system is a basic program that carries out file management, memory management, input/output management, and provides a user interface. The kernel is a program that achieves the basic function of the operating system such as memory management and task management.

The starting program is used to start local area networks (hereinafter, "LAN") such as a LAN 630 and a LAN 400, and a DHCP. The DHCP is a protocol to dynamically allocate an IP address to a computer on the LAN.

The RAM 612 is a memory from which data can be read and onto which data can be written. The RAM 612 stores a starting program read from the ROM 611, and the like. A memory swap partition 612a is set in the RAM 612, as illustrated in FIG. 11.

Figure 11:
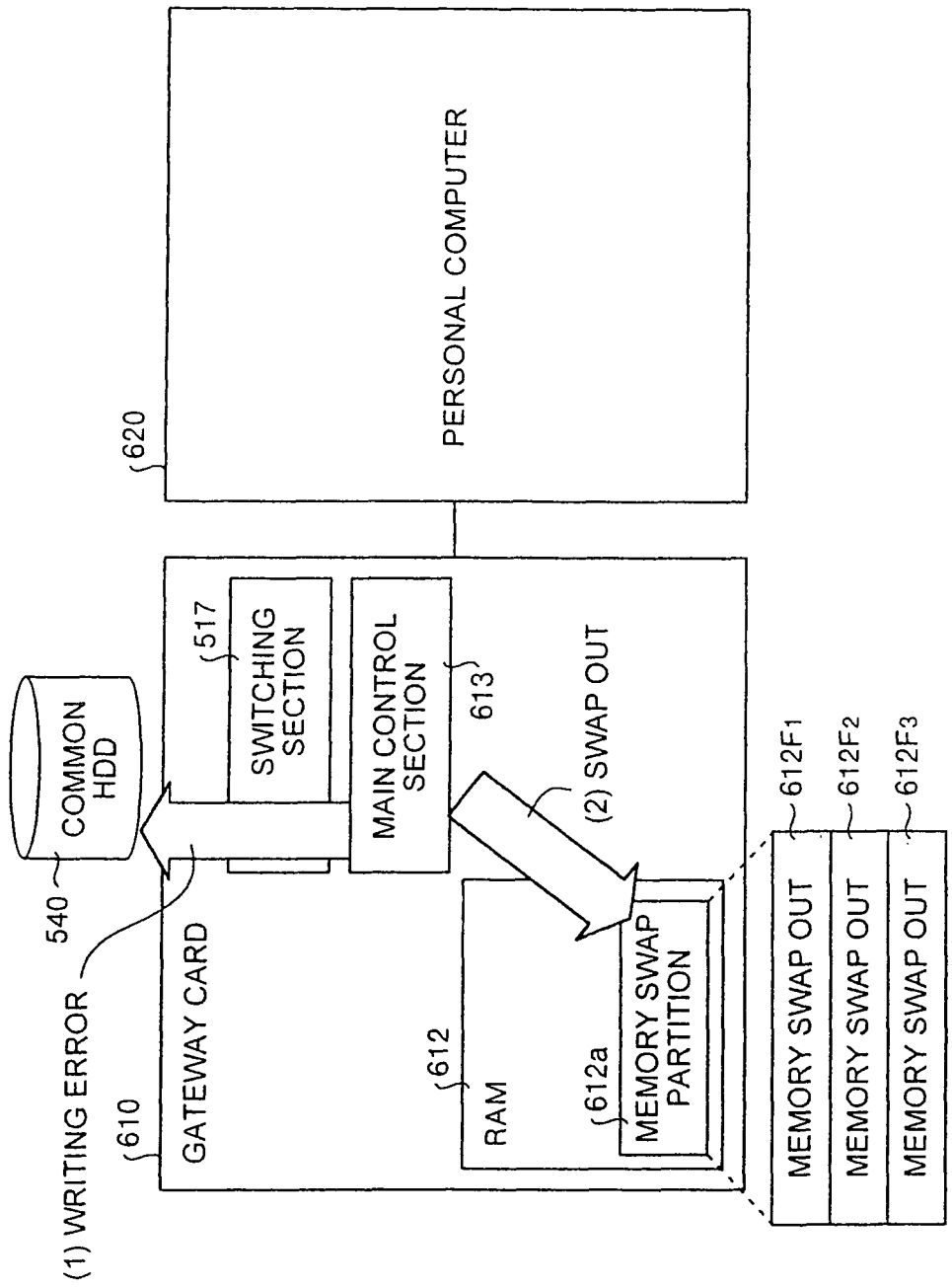
FIG. 11 illustrates a structure of a RAM in the second embodiment.

Referring to FIG. 11, the memory swap partition 612a is used to store or swap out data when a main control section 613 makes an error in writing this data into the common HDD 540 via the switching section 517. The swap out data is stored (i.e., swapped out) into the memory swap partition 612a in forms of files (i.e., memory swap out files $612F_1$ to $612F_3$), and is written again into the common HDD 540 based on a request for a retry.

In a system where one computer exclusively contains one HDD, usually, a swap partition is set in the HDD (hereinafter, "HDD swap partition"). When there is an error in writing data to the HDD, the data is stored (i.e., swapped out) in the HDD swap partition.

If this method is applied to the gateway personal computer 600, a switching of the switching section 517 at the time of storing (i.e., swapping out) the swap out data into the common HDD 540, interrupts the swapping out of the data into the common HDD 540. Thus, the swap out data may be destroyed.

On the other hand, as illustrated in FIG. 11, the memory swap partition 612a is provided in the RAM 612. The RAM 612 can be accessed easily at any time, and the swap out data is stored (i.e., swapped out) into this memory swap partition 612a. With this arrangement, destruction of the swap out data following the switching of the switching section 517 can be prevented.

A priority is set to the memory swap out files $612F_1$ to $612F_3$. Therefore, when a small volume of data remains in the RAM 612, a memory swap file of the lowest priority is deleted.

Referring back to FIG. 10, the gateway card 610 is provided with the main control section 613 in place of the main control section 515 and the input and output interface 513 in FIG. 1.

Similar to the main control section 515 in FIG. 1, the main control section 613 carries out switching control of the switching section 517, communications control with the personal computer 620, and access control to the common HDD 540.

In the main control section 613, a central processing unit (hereinafter, "CPU") 613a carries out switching control and communication control by executing various kinds of computer programs such as an operating system, a boot program, and an application program.

The CPU 613a executes an application program 613b. This application program 613b realizes certain procedure. A standard IDE driver 613c is a driver for a hard disk interface, installed as a standard, on the gateway card 610. The standard IDE driver 613c controls access to the common HDD 540 via the IDE bus 518 and the switching section 517.

A pseudo IDE driver 613d has a driver function similar to that of the standard IDE driver 613c, and a function of allocating an access from the CPU 613a to the common HDD 540 via either the standard IDE driver 613c or a communication section 613e.

Specifically, when the personal computer 620 is in the power saving mode, the switching section 517 is switched to the gateway card 610 side. In this case, the pseudo IDE driver 613d allocates the access from the CPU 613a to the common HDD 540 via the standard IDE driver 613c. The CPU 613a accesses the common HDD 540 via the pseudo IDE driver 613d, the standard IDE driver 613c, the IDE bus 518, and the switching section 517.

On the other hand, when the personal computer 620 is in the normal power mode, the switching section 517 is switched to the personal computer 620 side. In this case, the pseudo IDE driver 613d allocates the access from the CPU 613a to the common HDD 540 via the communication section 613e. The CPU 613a accesses the common HDD 540 via the pseudo IDE driver 613d, the communication section 613e, the LAN 630, the communication section 621d, the standard IDE driver 621c, the IDE bus 527, and the switching section 517.

The communication section 613e controls communication with the communication section 621d via the LAN 630.

The personal computer 620 has the main control section 621 in place of the insertion section 521 and the main control section 522 in FIG. 1. The main control section 621 carries out communications control with the gateway card 610, and access control to the common HDD 540.

In the main control section 621, a CPU 621a carries out a switching control and a communication control by executing various kinds of computer programs such as an operating system, a boot program, and an application program.

The CPU 621a executes an application program 621b. This application program 621b realizes certain procedure. A standard IDE driver 621c is a driver for a hard disk interface, installed as a standard, on the personal computer 620. The standard IDE driver 621c controls access to the common HDD 540 via the IDE bus 527 and the switching section 517. The communication section 621d of the personal computer 620 controls communications with the communication section 613e of the gateway card 610 via the LAN 630.

When the personal computer 620 is in the normal power mode, the switching section 517 is switched to the personal computer 620 side. In this case, the CPU 621a accesses the common HDD 540 via the standard IDE driver 621c, the IDE bus 527,and the switching section 517.

In the normal power mode, the main control section 613 of the gateway card 610 accesses the common HDD 540 via the LAN 630, the communication section 621d, the standard IDE driver 621c, the IDE bus 527, and the switching section 517.

Figure 12:
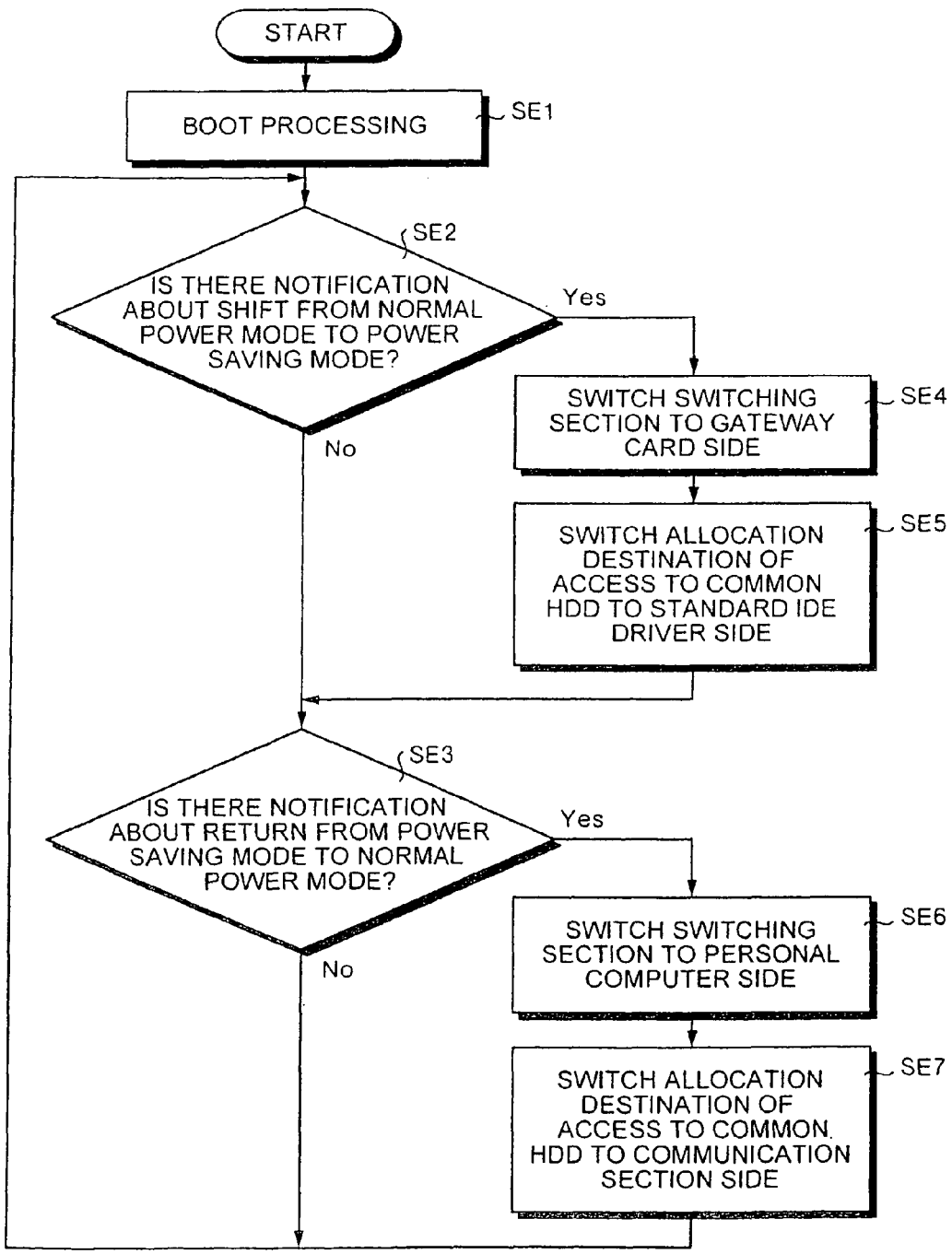
FIG. 12 is a flowchart of the operation of a main control section in the second embodiment.
Figure 13:
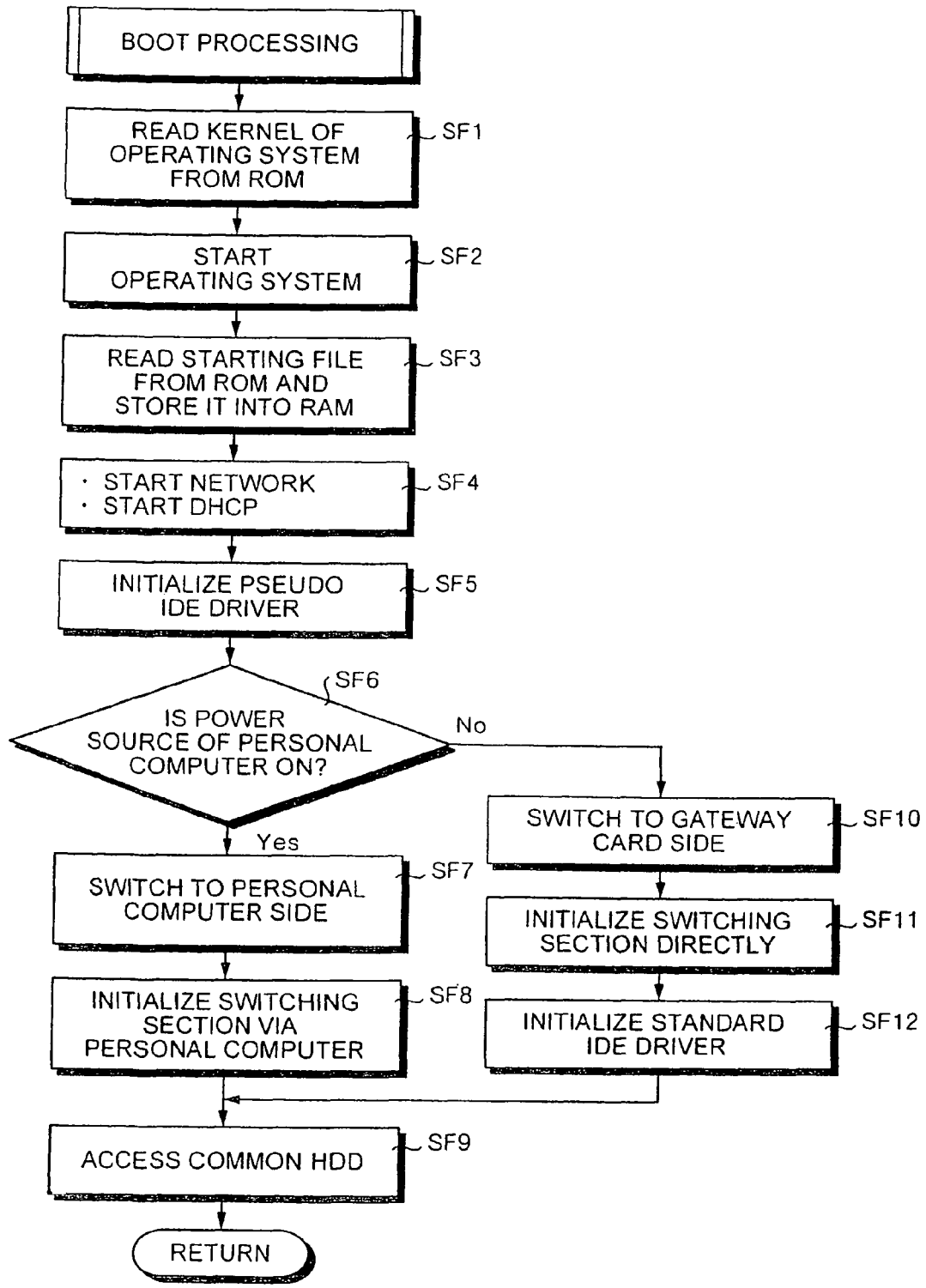
FIG. 13 is a flowchart of a boot processing of the main control section.

The operation of the gateway personal computer according to the second embodiment will be explained with reference to flowcharts in FIG. 12 and FIG. 13. FIG. 12 is a flowchart of the operation of the main control section 613 illustrated in FIG. 10. FIG. 13 is a flowchart of the boot processing of the main control section 613 illustrated in FIG. 12.

When the power source of the gateway personal computer 600 is turned ON, the power supply unit 530 supplies power to each section. With this arrangement, at step SE1 illustrated in FIG. 12, the CPU 613a of the main control section 613 executes a boot processing to boot each section.

The details of the boot processing are explained next, with reference to FIG. 13. At step SF1, the CPU 613a reads the kernel of the operating system from the ROM 611. At step SF2, the CPU 613a executes the kernel to start the operating system.

At step SF3, the CPU 613a reads the starting file from the ROM 611, and stores this starting file into the RAM 612. At step SF4, the CPU 613a executes the starting file to start the networks (the LAN 630, and the LAN 400) and the DHCP.

At step SFS, the CPU 613a initializes the pseudo IDE driver 613d. At step SF6, the CPU 613a decides whether the power source of the personal computer 620 is ON, and sets "Yes" as a result of the decision made in this case. At step SF7, the CPU 613a switches the switching section 517 to the personal computer 620 side.

At step SF8, the CPU 613a initializes the switching section 517 via the personal computer 620, that is, via the pseudo IDE driver 613d, the communication section 613e, the LAN 630, the communication section 621d, the standard IDE driver 621c, and the IDE bus 527.

At step SF9, the CPU 613a accesses the common HDD 540 via the pseudo IDE driver 613d, the communication section 613e, the LAN 630, the communication section 621d, the standard IDE driver 621c, the IDE bus 527, and the switching section 517.

On the other hand, when a result of the decision made at step SF6 is "No", the CPU 613a switches the switching section 517 to the gateway card 610 side at step SF10.

At step SF11, the CPU 613a directly initializes the switching section 517, that is, via the pseudo IDE driver 613d, the standard IDE driver 613c, and the IDE bus 518.

At step SF12, the CPU 613a initializes the standard IDE driver 613c. At step SF9, the CPU 613a accesses the common HDD 540 via the pseudo IDE driver 613d, the standard IDE driver 613c, the IDE bus 518, and the switching section 517.

Referring back to FIG. 12, at step SE2, the CPU 613a decides whether the personal computer 620 has notified the gateway card 610 about a shift from the normal power mode to the power saving mode, and sets "No" as a result of the decision made in this case.

At step SE3, the CPU 613a decides whether the personal computer 620 has notified the gateway card 610 about a return from the power saving mode to the normal power mode, and sets "No" as a result of the decision made in this case. Thereafter, the CPU 613a repeats step SE2 and step SE3, until when either of the result of the decision made at step SE2 or step SE3 becomes "Yes".

When the personal computer 620 notifies the gateway card 610 about a shift from the normal power mode to the power saving mode, the CPU 613a sets "Yes" as a result of the decision made at step SE2.

At step SE4, the CPU 613a switches the switching section 517 to the gateway card 610 side. At step SE5, the pseudo IDE driver 613d switches the allocation destination of the access to the common HDD 540 from the communication section 613e to the standard IDE driver 613c.

When the gateway card 610 generates an access request to the common HDD 540 (for example, a data writing request), the CPU 613a accesses the common HDD 540 via the pseudo IDE driver 613d, the standard IDE driver 613c, the IDE bus 518, and the switching section 517, and writes the data into the common HDD 540.

When the CPU 613a makes an error in writing the data, the CPU 613a stores (i.e., swaps out) this data as swap out data into the RAM 612 (for example, the memory swap out file 612F₁ as illustrated in FIG. 11).

When the personal computer 620 notifies the gateway card 610 about a return from the power saving mode to the normal power mode, the CPU 613a sets "Yes" as a result of the decision made at step SE3.

At step SE6, the CPU 613a switches the switching section 517 to the personal computer 620 side. At step SE7, the pseudo IDE driver 613d switches the allocation destination of the access to the common HDD 540 from the standard IDE driver 613c to the communication section 613e.

When the gateway card 610 generates an access request to the common HDD 540 (for example, a data writing request), the CPU 613a accesses the common HDD 540 via the pseudo IDE driver 613d, the communication section 613e, the LAN 630, the communication section 621d, the standard IDE driver 621c, the IDE bus 527, and the switching section 517, and writes the data into the common HDD 540.

When the CPU 613a makes an error in writing the data, the CPU 613a stores (i.e., swaps out) this data as swap out data into the RAM 612 in a similar manner to that explained above.

As explained above, according to the second embodiment, when the personal computer 620 is in the power saving mode, the pseudo IDE driver 613d allocates access from the CPU 613a to the common HDD 540 via the switching section 517. When the personal computer 620 is in the normal power mode, the pseudo IDE driver 613d allocates access from the CPU 613a to the common HDD 540 via the personal computer 620 and the switching section 517. Therefore, the personal computer 620 and the gateway card 610 can share the common HDD 540, which leads to the saving of space and power.

Further, when a data writing error occurs in the middle of the access, the data is swapped out to the RAM illustrated in FIG. 11. Therefore, the destruction of the swap out data following the switching can be avoided.

Moreover, a switching can occur during the access to the common HDD 540. If the access to the common HDD 540 during the switching is to be avoided, there is a risk of a destruction of the data.

To prevent the destruction of the data, a first modification of the second embodiment proposes a detailed control that is carried out at the switching time based on an operation table illustrated in FIG. 14.

In the operation table, a gateway card status expresses a power supply state of the gateway card 610 illustrated in FIG. 10. In the gateway card status, ON represents a state that power is being supplied to the gateway card 610. OFF represents a state that the power supply to the gateway card 610 is OFF.

A personal computer status expresses a power supply state of the personal computer 620. In the personal computer status, ON represents the normal power mode. OFF represents the power saving mode.

The main control section 613 of the gateway card 610 executes a processing according to a combination of the gateway card status and the personal computer status.

Specifically, when the gateway card status is ON and the personalcomputer status is ON, the CPU 613a of the main control section 613 switches the switching section 517 to the personal computer 620 side, and accesses the common HDD 540 via the personal computer 620, as described above.

When the gateway card status is ON and the personal computer status is OFF, the CPU 613a switches the switching section 517 to the gateway card 610 side, and accesses the common HDD 540 directly, that is, via the pseudo IDE driver 613d, the standard IDE driver 613c, the IDE bus 518, and the switching section 517.

When the gateway card status is ON and the personal computer status shifts from ON to OFF, the CPU 613a clears the data being accessed via the personal computer 620, by the common HDD 540 and the disk cache (i.e., the data being cached to the RAM 612), and directly accesses the HDD 540 again.

In other words, when the personal computer status shifts from ON to OFF, the CPU 613a switches the switching section 517 from the personal computer 620 side to the gateway card 610 side.

The CPU 613a clears the data up to immediately before the switching, and directly accesses the common HDD 540 again via the pseudo IDE driver 613d, the standard IDE driver 613c, the IDE bus 518, and the switching section 517.

In this access, the CPU 613a executes a data writing (or a data reading) to the common HDD 540 from the beginning, all over again.

Therefore, a destruction of the data during the switching can be avoided.

When the gateway card status is ON and the personal computer status shifts from OFF to ON, the CPU 613a switches the switching section 517 from the gateway card 610 side to the personal computer 620 side. Once the access to the common HDD 540 immediately after the switching is finished, the CPU 613a clears the data and the disk cache.

The CPU 613a clears the data up to immediately before the switching, and accesses the common HDD 540 again via the personal computer 620, that is, via the pseudo IDE driver 613d, the communication section 613e, the LAN 630, the communication section 621d, the standard IDE driver 621c, the IDE bus 527, and the switching section 517.

In this access, the CPU 613a executes a data writing (or a data reading) to the common HDD 540 from the beginning, all over again. Therefore, a destruction of the data during the switching can be avoided.

When the gateway card status is ON and the personal computer status shifts from OFF to ON (in the middle of the boot process immediately after the power supply is turned ON), the CPU 613a switches the switching section 517 from the gateway card 610 side to the personal computer 620 side.

The CPU 613a retries the access to the common HDD 540 via the personal computer 620 until the personal computer 620 is turned ON (or until time out).

When the personal computer status shifts from OFF to ON (in the middle of the end processing) in a state that the gateway card status is ON, the CPU 613a retries the access to the common HDD 540 via the personal computer 620.

After the personal computer 620 is turned OFF, the CPU 613a switches the switching section 517 from the personal computer 620 side to the gateway card 610 side. Immediately after this switching, the CPU 613a directly accesses the common HDD 540.

When the gateway card status shifts from ON to OFF (i.e., reset) and the personal computer status is ON, the CPU 613a accesses the common HDD 540 via the personal computer 620.

When the gateway card status shifts from ON to OFF (i.e., reset) and the personal computer status is OFF, the CPU 613a directly accesses the common HDD 540.

When the gateway card status shifts from OFF to ON (i.e., start) and the personal computer status is OFF, the CPU 613a directly accesses the common HDD 540.

When the gateway card status shifts from OFF to ON (i.e., start) and the personal computer status is ON, the CPU 613a accesses the common HDD 540 via the personal computer 620. A case that the gateway card 610 is OFF is not assumed.

As explained above, according to the first modification of the second embodiment, when a switching of the switching section 517 occurs in the middle of the access to the common HDD 540, the access to the common HDD 540 is retried after the switching. Therefore, a destruction of the data following the switching can be avoided.

In the second embodiment, as illustrated in FIG. 11, the memory swap partition 612a is provided in only the RAM 612, and the swap out data is stored (i.e., swapped out) into the memory swap partition 612a. However, the swap out data may be stored (i.e., swapped out) into both the RAM 612 and the common HDD 540. An example of this structure will be explained as a second modification of the second embodiment.

Figure 15:
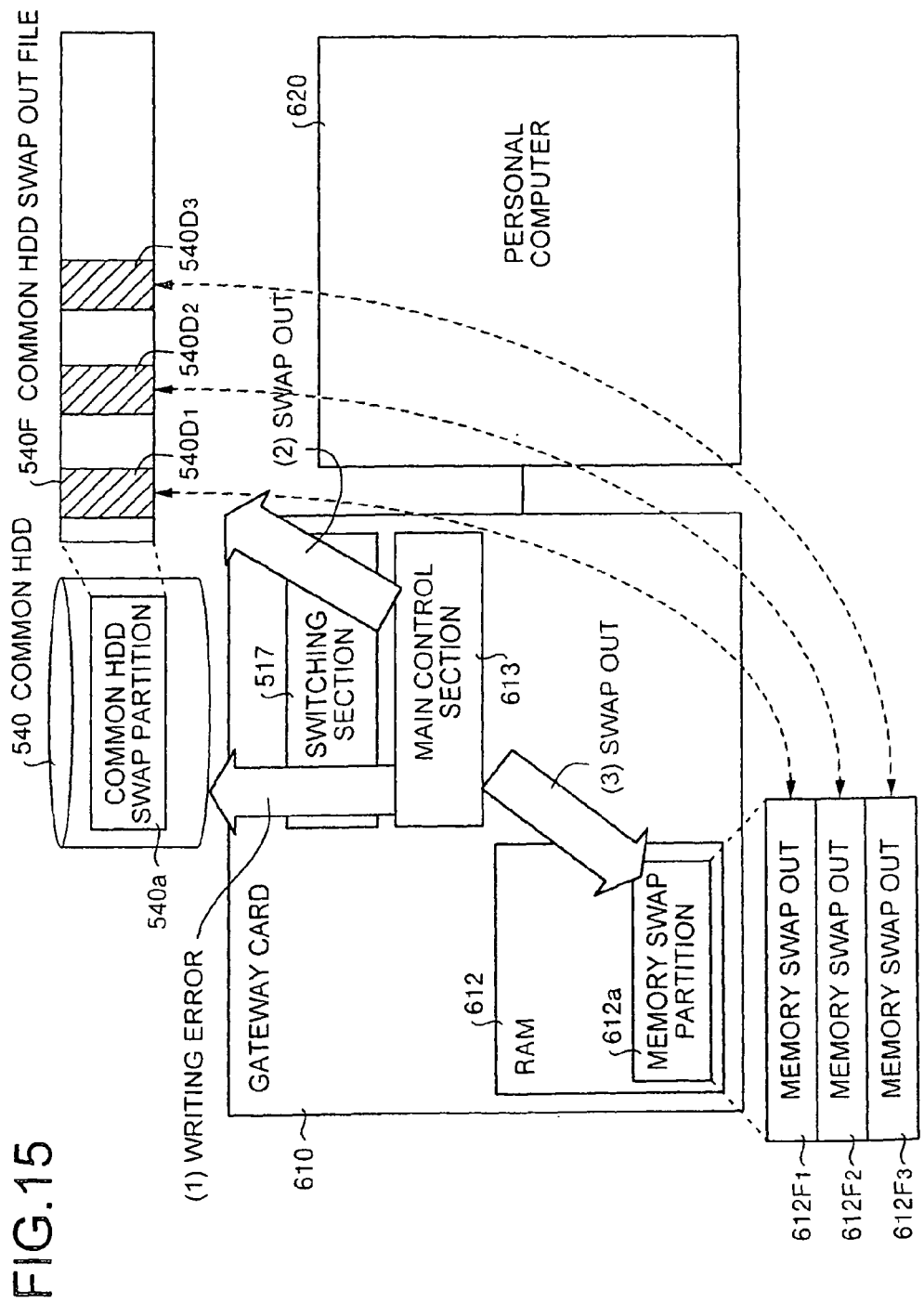
FIG. 15 is a block diagram of a structure of the personal computer according to a second modification of the second embodiment.

FIG. 15 is a block diagram of a structure of a personal computer according to the second modification of the second embodiment. In FIG. 15, portions corresponding to those in FIG. 11 are accompanied with like reference numerals. In FIG. 15, a common HDD swap partition 540a is set in the common HDD 540, in addition to the memory swap partition in the RAM 612.

The main control section 613 stores (i.e., swaps out) data as swap out data in the common HDD swap partition 540a when the main control section 613 makes an error in writing the data into the common HDD 540 via the switching section 517. The swap out data is stored into the common HDD swap partition 540a in the form of a common HDD swap out file 540F.

When a switching of the switching section 517 occurs repeatedly in the middle of storing (i.e., swapping out) the swap out data into the common HDD swap partition 540a, the storing (i.e., swapping out) is interrupted. As a result, blank portions $540D_1$ to $540D_3$ are generated in the common HDD swap out file 540F.

This problem is solved in the second modification of the second embodiment. At the time of switching the switching section 517, the change in power mode triggers the main control section 613 to store (i.e., swap out) the swap out data corresponding to the blank portions $540D_1$ to $540D_3$ into the memory swap partition 612a (that contains memory swap out files $612F_1$ to $612F_3$). Thus, these memory swap out files $612F_1$ to $612F_3$ correspond to the blank portions $540D_1$ to $540D_3$.

Then, the main control section 613 reads the swap out data corresponding to the memory swap out files $612F_1$ to $612F_3$ from the memory swap partition 612a of the RAM 612, and stores the swap out data into the common HDD swap partition 540a of the common HDD 540. Specifically, the main control section 613 merges the swap out data corresponding to the memory swap out files $612F_1$ to $612F_3$ with the blank portions $540D_1$ to $540D_3$ of the common HDD swap out file 540F, thereby to prepare the complete common HDD swap out file 540F.

As explained above, according to the second modification of the second embodiment, when the data writing error occurs during the access to the common HDD 540, this data is swapped out into the common HDD 540. When a switching of the switching section 517 occurs during the swap out, the data is swapped into the RAM 612. Thereafter, the data swapped out to the common HDD 540 and the data swapped out to the RAM 612 are merged together. Therefore, a destruction of the swap out data following the switching can be avoided.

In the second modification of the second embodiment, as illustrated in FIG. 15, the RAM 612 stores (i.e., swaps out) the swap out data during the switching of the switching section 517, and the swap out data is merged with the common HDD swap out file 540F. However, regardless of the switching, the same swap out data may be stored (i.e., swapped out) in parallel into both the common HDD 540 and the RAM 612. An example of this structure will be explained as a third modification of the second embodiment.

Figure 16:
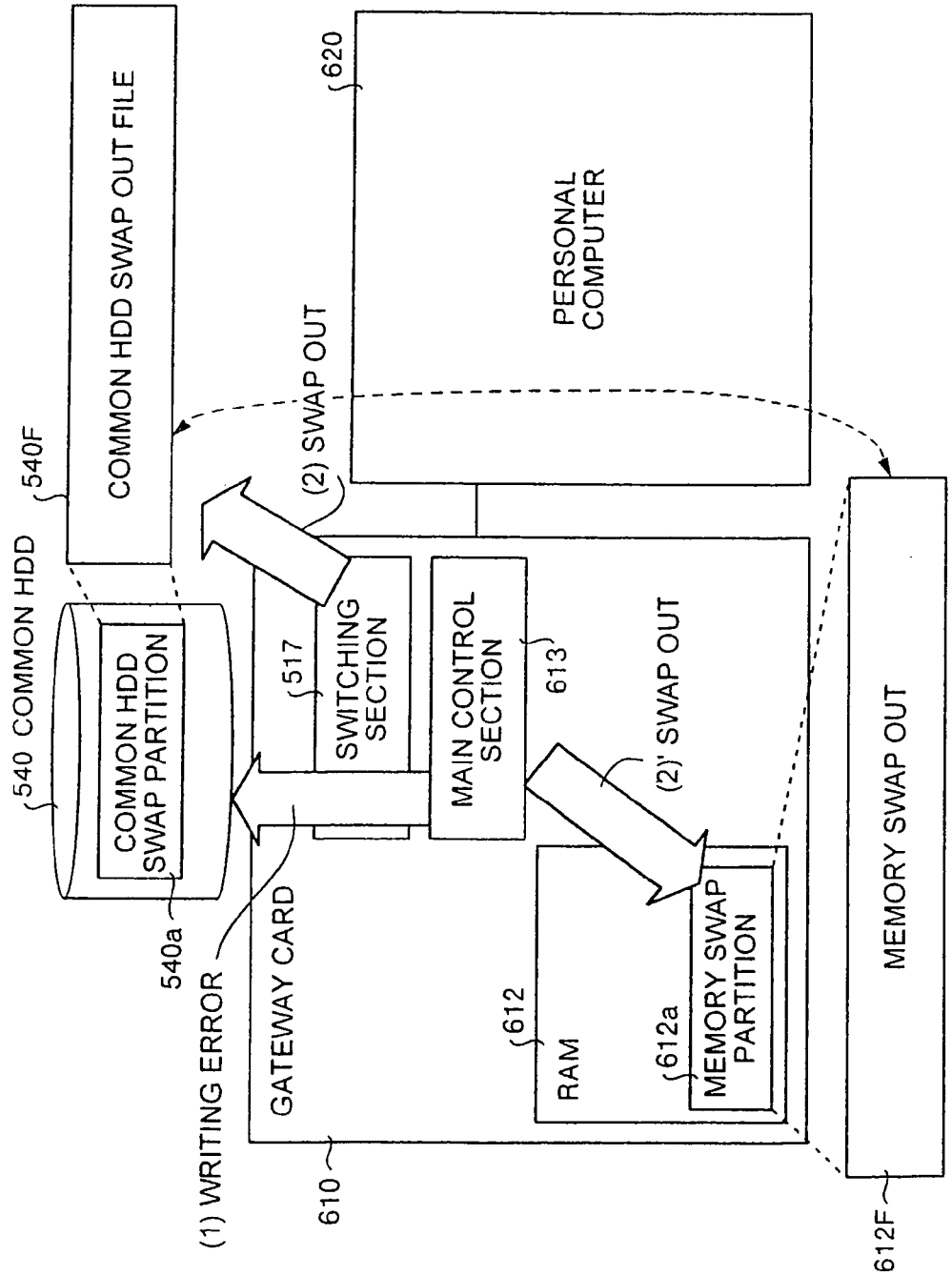
FIG. 16 is a block diagram of a structure of the personal computer according to a third modification of the second embodiment.

FIG. 16 is a block diagram of a structure of the personal computer according to a third modification of the second embodiment. In FIG. 16, portions corresponding to those in FIG. 15 are accompanied with like reference numerals. When the main control section 613 makes an error in writing data into the common HDD 540, the main control section 613 stores this data as swap out data into the common HDD swap partition 540a of the common HDD 540. As a result, the common HDD swap partition 540a stores the common HDD swap out file 540F.

In parallel with the above operation, the main control section 613 stores (i.e., swaps out) the writing error data as swap out data into the memory swap partition 612a of the RAM 612. As a result, the memory swap out file 612F is stored into the memory swap partition 612a.

When the switching section 517 is switched during the storing (i.e., swapping out) of the swap out data into both the common HDD swap partition 540a and the memory swap partition 612a, blank spaces are generated in the common HDD swap out file 540F, as explained in the second modification of the second embodiment.

In the third modification of the second embodiment, when a switching of the switching section 517 occurs, the main control section 613 reads the swap out data corresponding to the memory swap out file 612F from the memory swap partition 612a of the RAM 612, by using the shift of the power source mode as a trigger. The main control section 613 stores the swap out data into the common HDD swap partition 540a of the common HDD 540. Specifically, the main control section 613 merges the swap out data corresponding to the memory swap out file 612F with the common HDD swap out file 540F, thereby to prepare the complete common HDD swap out file 540F.

As explained above, according to the third modification of the second embodiment, when a data writing error occurs in the middle of an access to the common HDD 540, this data is swapped out into both the common HDD 540 and the RAM 612 in parallel. When a switching of the switching section 517 occurs during the swapping out, the data swapped out to the common HDD swap partition 540a and the data swapped out to the RAM 612 are merged together. Therefore, a destruction of the swap out data following the switching can be avoided.

The structures of the personal computers according to the first embodiment (including the first and second modifications) and the second embodiment (including the first to third modifications) of the present invention have been described in detail with reference to the drawings. Detailed structure examples are not limited to these structures according to the first and second embodiments. Any other structures having a design alteration within a range not deviating from the gist of the present invention are all included in the present invention.

Figure 17:
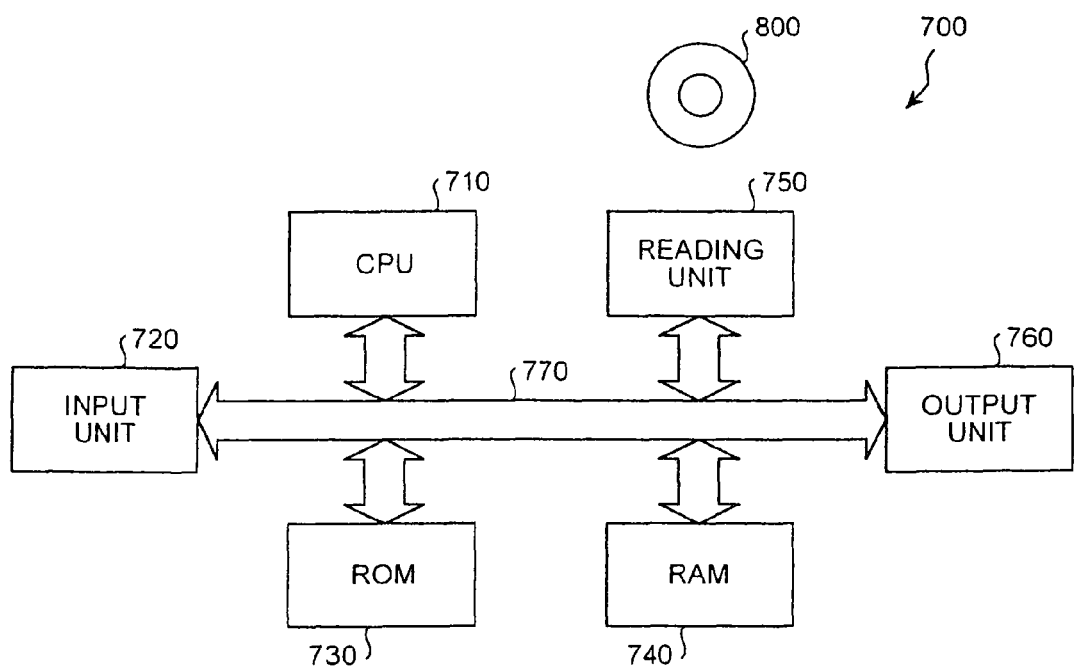
FIG. 17 is a block diagram of a structure of the personal computer according to a third modification of the first embodiment and a fourth modification of the second embodiment of the present invention.

For example, as a third modification of the first embodiment and a fourth modification of the second embodiment, a program may be recorded onto a computer readable recording medium as illustrated in a block diagram in FIG. 17. In other words, a computer readable recording medium 800 may store a program to achieve the functions of the gateway personal computer 500 including the gateway card 510, and the personal computer 520 (see FIG. 1) and the gateway personal computer 600 including the gateway card 610, and the personal computer 620 (see FIG. 10). A computer 700 reads the program stored in this recording medium 800, and executes the program to achieve each function.

The computer 700 comprises a CPU 710 that executes the program, an input unit 720 that includes a keyboard and a mouse, a ROM 730 that stores various kinds of data, a RAM 740 that stores operation parameters and the like, a reading unit 750 that reads the program from the recording medium 800, an output unit 760 that includes a display and a printer, and a bus 770 that interconnects each section of each unit.

The CPU 710 reads the program stored in the recording medium 800 via the reading unit 750, and executes the program to achieve the functions. The recording medium 800 may be an optical disk, a flexible disk, or a hard disk.

As explained above, according to one aspect of the present invention, the information processor and the gateway card share the memory. Therefore, space and power can be saved.

Furthermore, when both the information processor and the gateway card are in the middle of booting, the gateway card and the information processor can be started normally.

Moreover, the memory partitions can be accurately allocated to the information processor and the gateway card respectively before and after the switching. Therefore, a malfunctioning is prevented.

Furthermore, when a switching occurs in the middle of the access, a destruction of the data following the switching can be avoided.

Moreover, when a data writing error occurs in the middle of the access, a destruction of the swap out data following the switching can be avoided.

Furthermore, when a data writing error occurs in the middle of the access, and when a switching of the switching unit occurs during a swapping out, a destruction of the swap out data following the switching can be avoided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gateway card that is connected to an information processor and that receives and transmits data between different networks, the information processor having a normal power mode and a power saving mode, the gateway card comprising:
   a switching unit that connects a memory to either the information processor or the gateway card;
   a switch control unit that controls the switching unit to connect the memory to the information processor when the information processor is in the normal power mode, and controls the switching unit to connect the memory to the gateway card when the normal power mode of the information processor is changed to the power saving mode, wherein when both the information processor and the gateway card are booted at the same time, the switch control unit controls the switching unit to connect the memory to the gateway card, and controls the switching unit to connect the memory to the information processor after the gateway card is booted.

2. The gateway card according to claim 1, wherein
   the memory is partitioned into a first partition corresponding to the information processor and a second partition corresponding to the gateway card, the gateway card further comprising a valid-invalid unit that
   validates the first partition and invalidates the second partition when the information processor is in the normal power mode, and
   invalidates the first partition and validates the second partition when the normal power mode is changed to the power saving mode.

3. The gateway card according to claim 1, further comprising a deciding unit that decides whether a data transfer speed of the information processor is different from that of the gateway card and whether the normal power mode is changed to the power saving mode, wherein
   the switch control unit controls the switching unit to connect the memory to the gateway card, and initializes the memory so as to match a data transfer speed of the memory with the data transfer speed of the gateway card after the normal power mode is changed to the power saving mode, when it is decided that the data transfer speed of the information processor is different from that of the gateway card and that the normal power mode is changed to the power saving mode.

4. A gateway device comprising:
   a memory;
   an information processor with a power control unit that shifts an operation status of the information processor from a normal power mode to a power saving mode and vice versa based on a predetermined condition; and
   a gateway card that is connected to the information processor and that receives and transmits data between different networks, the gateway card including
   a switching unit that connects the memory with either the information processor or the gateway card;
   a switch control unit that controls the switching unit to connect the memory to the information processor when the information processor is in the normal power mode, and controls the switching unit to connect the memory to the gateway card when the normal power mode of the information processor is changed to the power saving mode, wherein when both the information processor and the gateway card are booted at the same time, the switch control unit controls the switching unit to connect the memory to the gateway card, and controls the switching unit to connect the memory to the information processor after the gateway card is booted.

5. The gateway device according to claim 4, wherein
the memory has a first partition corresponding to the information processor and a second partition corresponding to the gateway card, the gateway card further comprising a valid-invalid unit that
validates the first partition and invalidates the second partition when the information processor is in the normal power mode, and
invalidates the first partition and validates the second partition when the normal power mode is changed to the power saving mode.

6. The gateway device according to claim 4, wherein the gateway card further comprising a deciding unit that decides whether a data transfer speed of the information processor is different from that of the gateway card and whether the normal power mode is changed to the power saving mode, wherein
the switch control unit controls the switching unit to connect the memory to the gateway card, and initializes the memory so as to match a data transfer speed of the memory with the data transfer speed of the gateway card after the normal power mode is changed to the power saving mode, when it is decided that the data transfer speed of the information processor is different from that of the gateway card and that the normal power mode is changed to the power saving mode.

7. A method of controlling a gateway card, which is connected to an information processor and which receives and transmits data between different networks, the information processor having a normal power mode and a power saving mode, the method comprising:
connecting the information processor to the memory when the information processor is in the normal power mode enabling the information processor to read or write data via the networks;
connecting the gateway card to the memory when the normal power mode of the information processor is changed to the power saving mode;
accessing the memory via the information processor when the connecting connects the information processor to the memory; and
accessing the memory when the connecting connects the gateway card to the memory, wherein when both the information processor and the gateway card are booted at the same time, controlling the connecting to connect the memory to the gateway card upon booting the information processor and the gateway card, and controlling the connecting to connect the memory to the information processor after the gateway card is booted.

8. The method according o claim 7, wherein the memory having a first partition corresponding to the information processor and a second partition corresponding to the gateway card, the method further comprising:
validating the first partition and invalidating the second partition when the information processor is in the normal power mode; and
invalidating the first partition and validating the second partition when the normal power mode is changed to the power saving mode.

9. The method according to claim 7, further comprising:
deciding whether a data transfer speed of the information processor is different from that of the gateway card and whether the normal power mode is changed to the power saving mode; and
connecting the gateway card to the memory, and initializing the memory so as to match a data transfer speed of the memory with the data transfer speed of the gateway card after the normal power mode is changed to the power saving mode, when it is decided that the data transfer speed of the information processor is different from that of the gateway card and that the normal power mode is changed to the power saving mode.

10. The method according to claim 9, further comprising:
swapping out of data into the memory and a swap out memory when data writing error occurs in the middle of the access; and
merging the data swapped out to the memory with the data swapped out to the swap out memory when the connecting occurs during the swapping.

11. A method of controlling a gateway device having a memory; an information processor with a normal power mode and a power saving mode, wherein the normal power mode is changed to the power saving mode and vice versa based on a predetermined condition; and a gateway card that is connected to the information processor and that receives and transmits data between different networks, the method comprising:
connecting the information processor to the memory when the information processor is in the normal power mode enabling the information processor to read or write data via the networks;
connecting the gateway card to the memory when the normal power mode of the information processor is changed to the power saving mode;
accessing the memory via the information processor when the connecting connects the information processor to the memory; and
accessing the memory when the connecting connects the gateway card to the memory, wherein when both the information processor and the gateway card are booted at the same time, controlling the connecting to connect the memory to the gateway card upon booting the information processor and the gateway card, and controlling the connecting to connect the memory to the information processor after the gateway card is booted.

12. A non-transitory computer-readable recording medium that stores therein a computer program that realizes on a computer method for controlling a gateway card, which is connected to an information processor and which receives and transmits data between different networks, the information processor having a normal power mode and a power saving mode, the computer program making the computer execute:
connecting the information processor to the memory when the information processor is in the normal power mode enabling the information processor to read or write data via the networks;
connecting the gateway card to the memory when the normal power mode of the information processor is changed to the power saving mode;
accessing the memory via the information processor when the connecting connects the information processor to the memory; and
accessing the memory when the connecting connects the gateway card to the memory, wherein when both the information processor and the gateway card are booted at the same time, controlling the connecting to connect the memory to the gateway card upon booting the information processor and the gateway card, and controlling the connecting to connect the memory to the information processor after the gateway card is booted.

13. A method of controlling a gateway unit, which is connected to an information processor and which receives and transmits data between different networks, the information processor having a normal power mode and a power saving mode, the method comprising:
   connecting the information processor to the memory when the information processor is in the normal power mode enabling the information processor to read or write data via the networks;
   connecting the gateway unit to the memory when the normal power mode of the information processor is changed to the power saving mode;
   accessing the memory via the information processor when the connecting connects the information processor to the memory; and
   accessing the memory when the connecting connects the gateway unit to the memory, wherein when both the information processor and the gateway unit are booted at the same time, controlling the connecting to connect the memory to the gateway unit upon booting the information processor and the gateway unit, and controlling the connecting to connect the memory to the information processor after the gateway unit is booted.

14. The method according to claim 13, wherein the memory having a first partition corresponding to the information processor and a second partition corresponding to the gateway unit, the method further comprising:
   validating the first partition and invalidating the second partition when the information processor is in the normal power mode; and
   invalidating the first partition and validating the second partition when the normal power mode is changed to the power saving mode.

15. The method according to claim 13, further comprising:
   deciding whether a data transfer speed of the information processor is different from that of the gateway unit and whether the normal power mode is changed to the power saving mode; and
   connecting the gateway unit to the memory, and initializing the memory so as to match a data transfer speed of the memory with the data transfer speed of the gateway unit after the normal power mode is changed to the power saving mode, when it is decided that the data transfer speed of the information processor is different from that of the gateway unit and that the normal power mode is changed to the power saving mode.

16. A method of controlling a gateway device having a memory; an information processor with a normal power mode and a power saving mode, wherein the normal power mode is changed to the power saving mode and vice versa based on a predetermined condition; and a gateway unit that is connected to the information processor and that receives and transmits data between different networks, the method comprising:
   connecting the information processor to the memory when the information processor is in the normal power mode enabling the information processor to read or write data via the networks;
   connecting the gateway unit to the memory when the normal power mode of the information processor is changed to the power saving mode;
   accessing the memory via the information processor when the connecting connects the information processor to the memory; and
   accessing the memory when the connecting connects the gateway unit to the memory, wherein when both the information processor and the gateway unit are booted at the same time, controlling the connecting to connect the memory to the gateway unit upon booting the information processor and the gateway unit, and controlling the connecting to connect the memory to the information processor after the gateway unit is booted.

17. A non-transitory computer-readable recording medium that stores therein a computer program that realizes on a computer a method of controlling a gateway unit, which is connected to an information processor and which receives and transmits data between different networks, the information processor having a normal power mode and a power saving mode, the computer program making the computer execute:
   connecting the information processor to the memory when the information processor is in the normal power mode enabling the information processor to read or write data via the networks;
   connecting the gateway unit to the memory when the normal power mode of the information processor is changed to the power saving mode;
   accessing the memory via the information processor when the connecting connects the information processor to the memory; and
   accessing the memory when the connecting connects the gateway unit to the memory, wherein when both the information processor and the gateway unit are booted at the same time, controlling the connecting to connect the memory to the gateway unit upon booting the information processor and the gateway unit, and controlling the connecting to connect the memory to the information processor after the gateway unit is booted.

18. A non-transitory computer-readable recording medium that stores therein a computer program that realizes on a computer a method of controlling a gateway device having a memory; an information processor with a normal power mode and a power saving mode, wherein the normal power mode is changed to the power saving mode and vice versa based on a predetermined condition; and a gateway unit that is connected to the information processor and that receives and transmits data between different networks, the computer program making the computer execute:
   connecting the information processor to the memory so that the gateway unit may access the memory via the information processor when the information processor is in the normal power mode enabling the information processor to read or write data via the networks;
   connecting the gateway unit to the memory when the normal power mode of the information processor is changed to the power saving mode;
   accessing the memory via the information processor when the connecting connects the memory to the information processor; and
   accessing the memory when the connecting connects the gateway unit to the memory, wherein when both the information processor and the gateway unit are booted at the same time, controlling the connecting to connect the memory to the gateway unit upon booting the information processor and the gateway unit, and controlling the connecting to connect the memory to the information processor after the gateway unit is booted.

\* \* \* \* \*